US007732718B2

(12) United States Patent
Tatsuoka et al.

(10) Patent No.: US 7,732,718 B2
(45) Date of Patent: Jun. 8, 2010

(54) COMBINATION WEIGHING APPARATUS WITH CONVEYING UNIT INCLUDING TROUGH AND SPIRAL MEMBER

(75) Inventors: Masahiko Tatsuoka, Ritto (JP); Hiroshi Hattori, Ritto (JP); Mikio Kishikawa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 12/463,196

(22) Filed: May 8, 2009

(65) Prior Publication Data

US 2009/0277692 A1 Nov. 12, 2009

(30) Foreign Application Priority Data

May 9, 2008 (JP) ............................ 2008-122970
May 30, 2008 (JP) ............................ 2008-142506

(51) Int. Cl.
*G01G 19/387* (2006.01)
*G01G 13/08* (2006.01)

(52) U.S. Cl. ..................... 177/25.18; 198/661; 198/676

(58) Field of Classification Search ............. 177/25.18; 198/661, 676
See application file for complete search history.

(56) References Cited

U.S. PATENT DOCUMENTS 3,702,128 A * 11/1972 Trotter, Jr. .................. 198/582
5,050,777 A * 9/1991 Buchser .................. 222/146.6
5,143,166 A * 9/1992 Hough ...................... 177/128
5,143,202 A * 9/1992 Lehmann et al. ............ 198/670
5,340,949 A * 8/1994 Fujimura et al. ......... 177/25.18
5,558,203 A * 9/1996 Herm et al. ................. 198/661
6,437,256 B1 * 8/2002 Miyamoto ............... 177/25.18
7,301,110 B2 * 11/2007 Hansen .................. 177/25.18
7,569,778 B2 * 8/2009 Hansen .................. 177/25.18
2005/0241916 A1 * 11/2005 Gentili ...................... 198/545
2006/0196701 A1 9/2006 Hansen
2009/0277692 A1 * 11/2009 Tatsuoka et al. ......... 177/25.18

* cited by examiner

*Primary Examiner*—Randy W Gibson
(74) *Attorney, Agent, or Firm*—Global IP Counselors, LLP

(57) ABSTRACT

A combination weighing apparatus includes a dispersion unit, conveying units and weighing units. The dispersion unit is arranged to radially disperse product material. The conveying units are arranged around a periphery of the dispersion unit. The weighing units are arranged around a periphery of the conveying units. Each of the conveying units includes a trough. At least one of the troughs has a cross-sectional diameter that gradually increases generally from the inside end to the outside end so that the one of the troughs and an adjacent one of the troughs are kept in contact with each other from the inside ends to the outside ends. At least one of the conveying units has a spiral member disposed over a bottom surface of the trough. The spiral member is configured and arranged to convey the product material supplied from the dispersion unit toward the outside end of the trough.

10 Claims, 23 Drawing Sheets

1
2
3
3
4
4
5
5
6
6

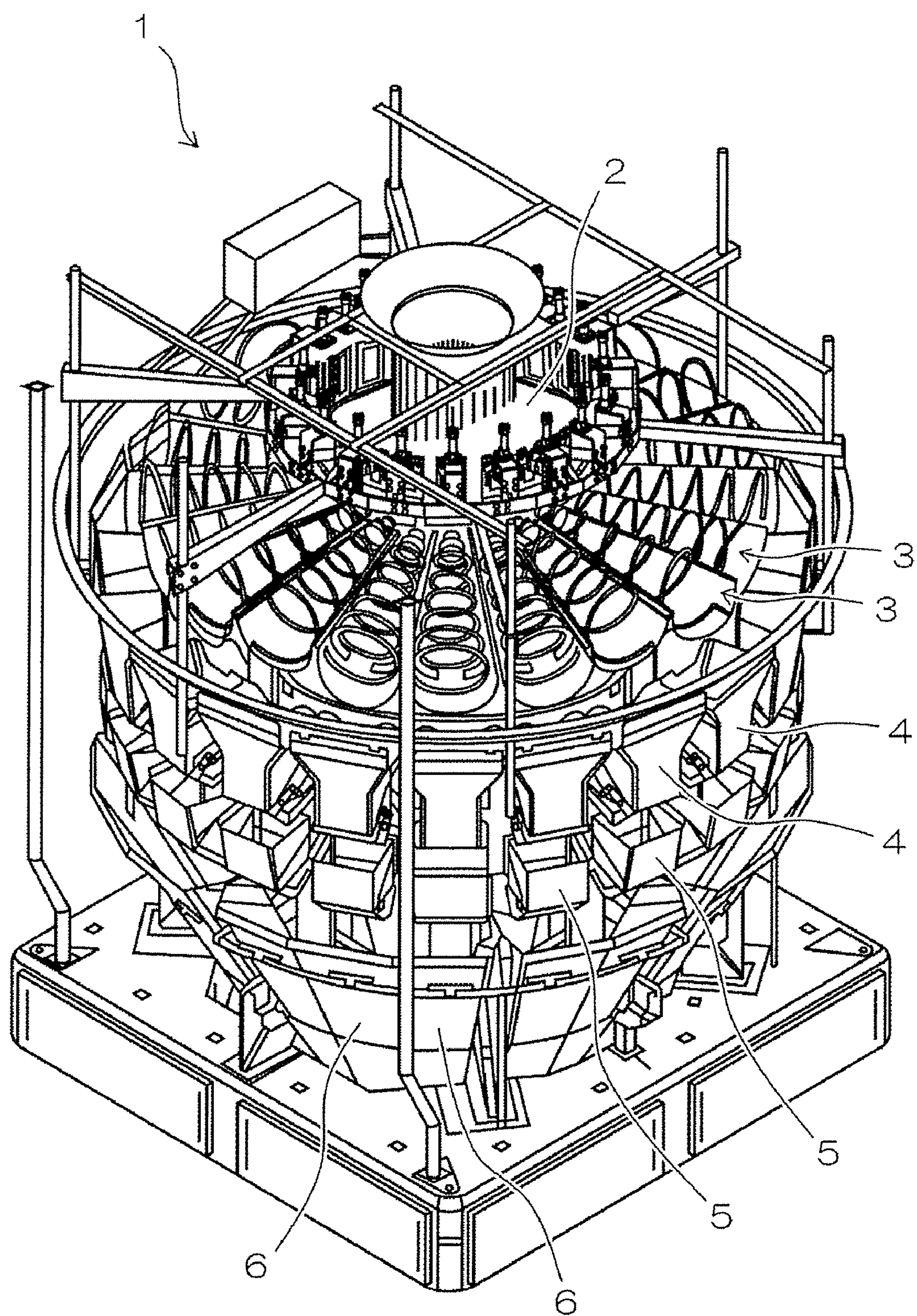
F I G. 1

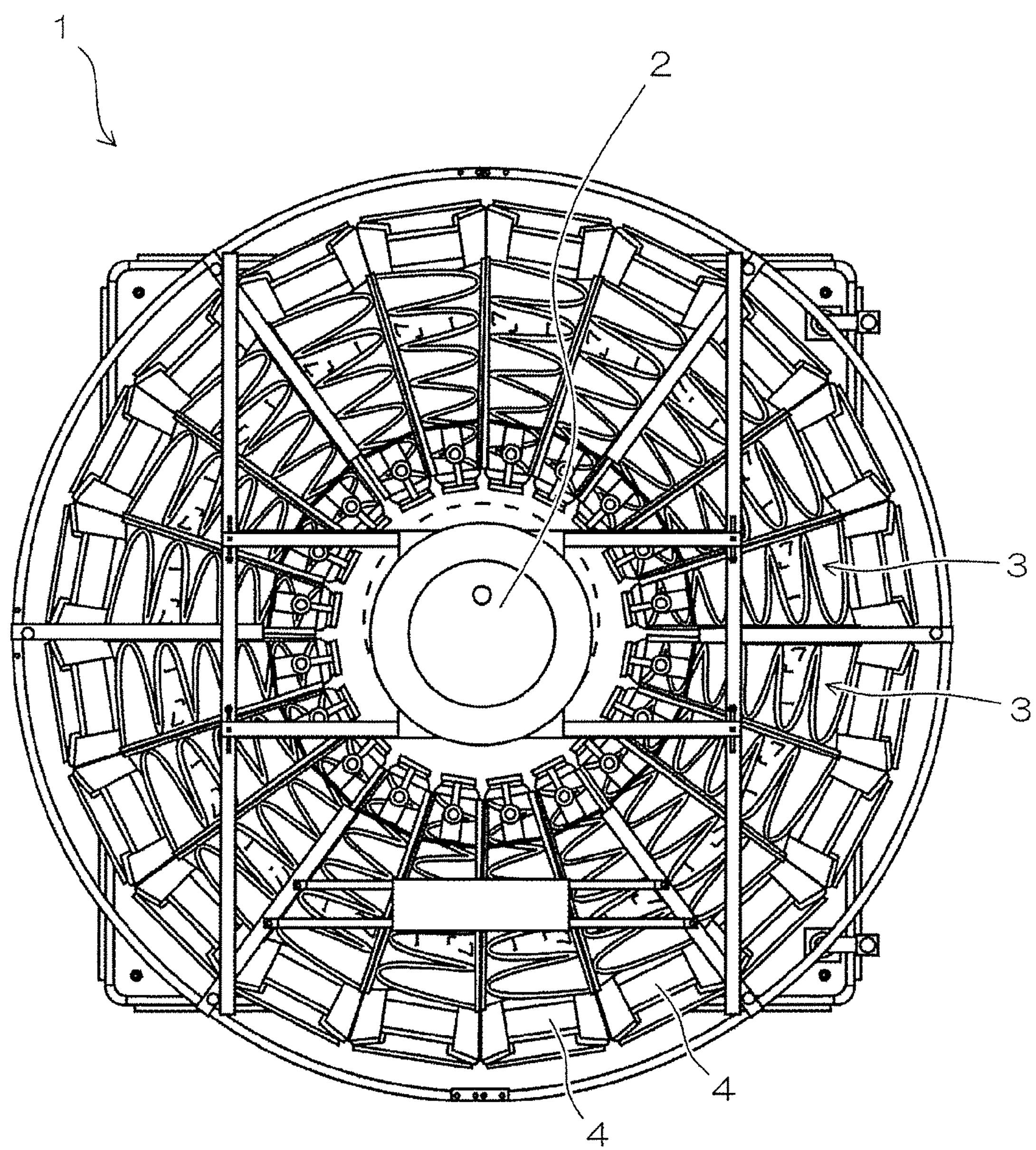
F I G. 2

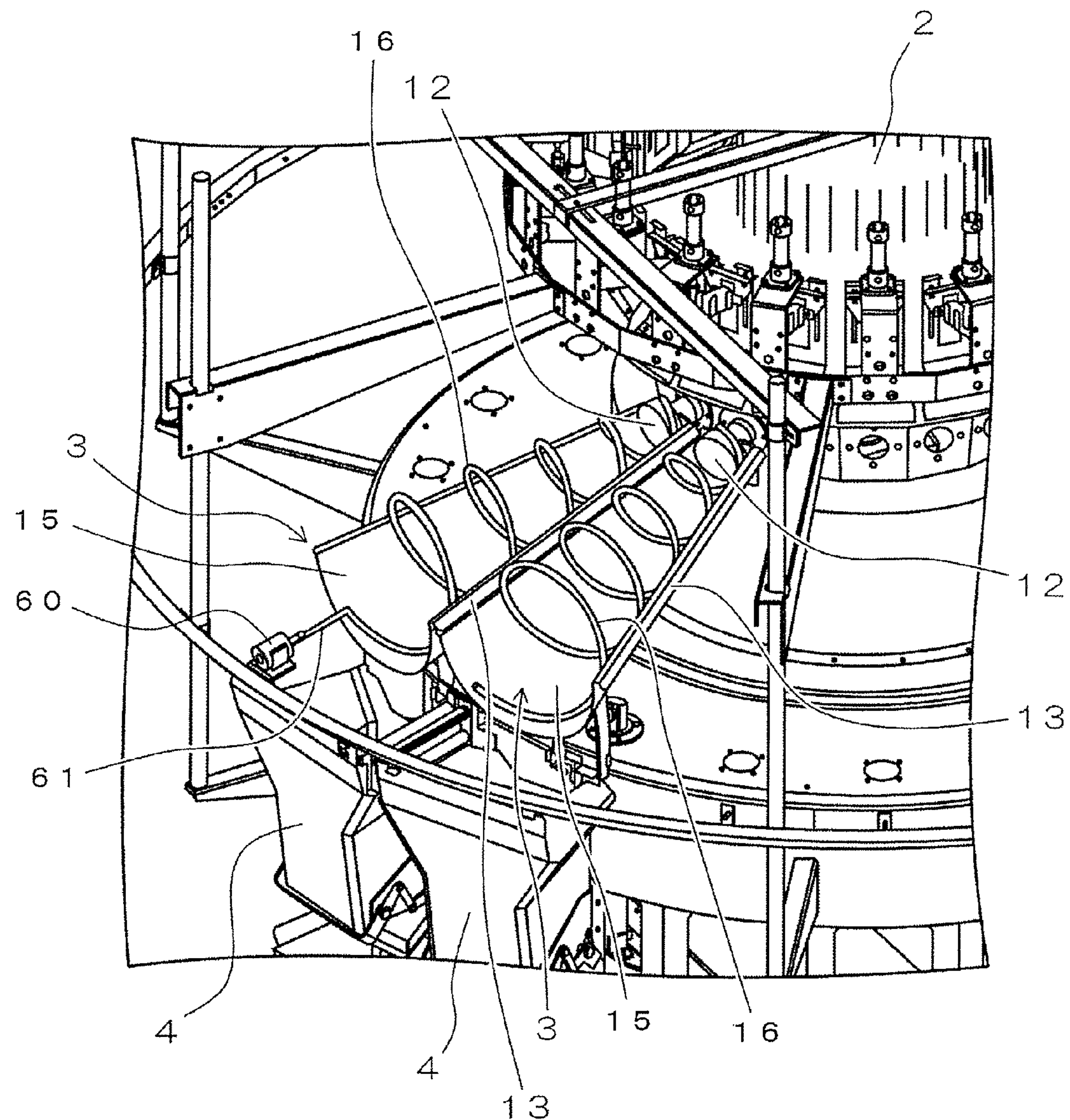
F I G. 3

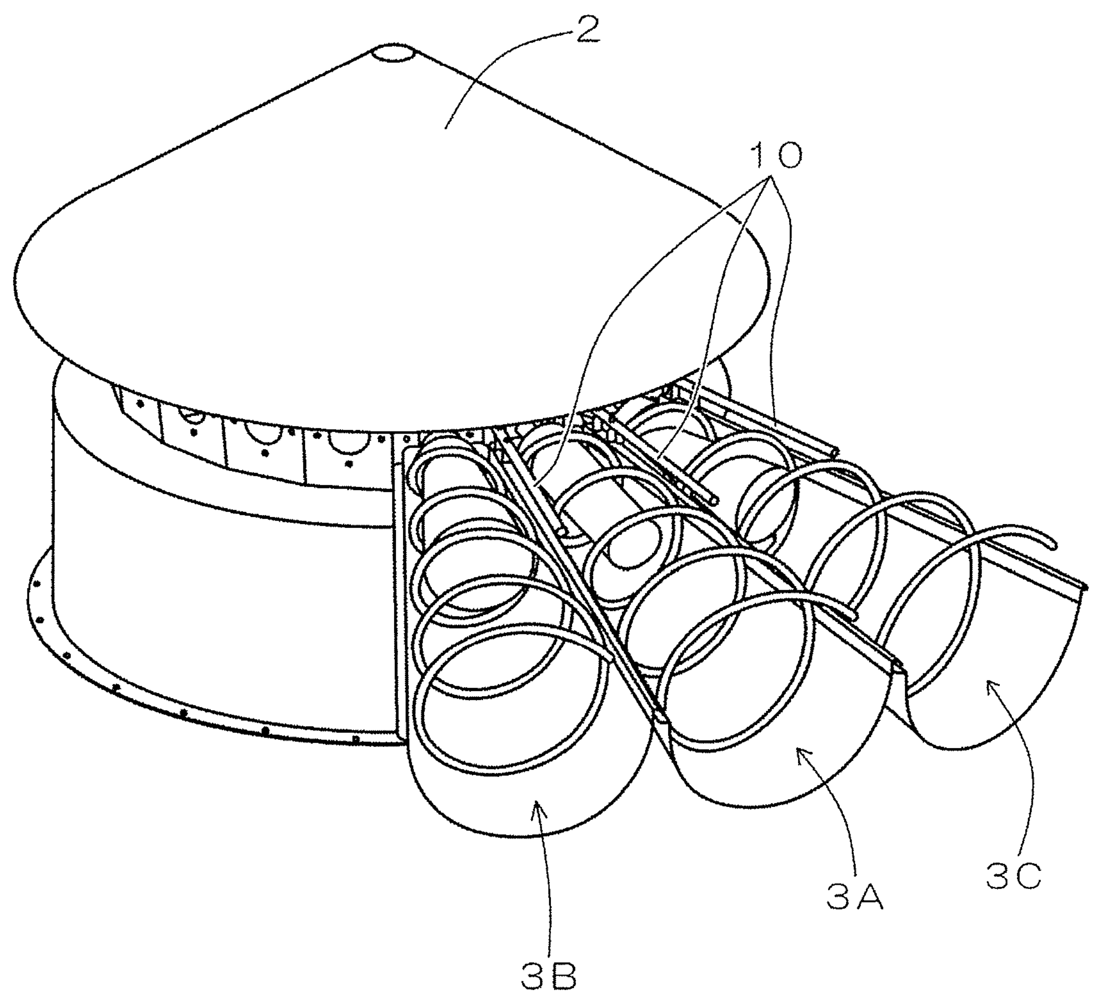
F I G. 9

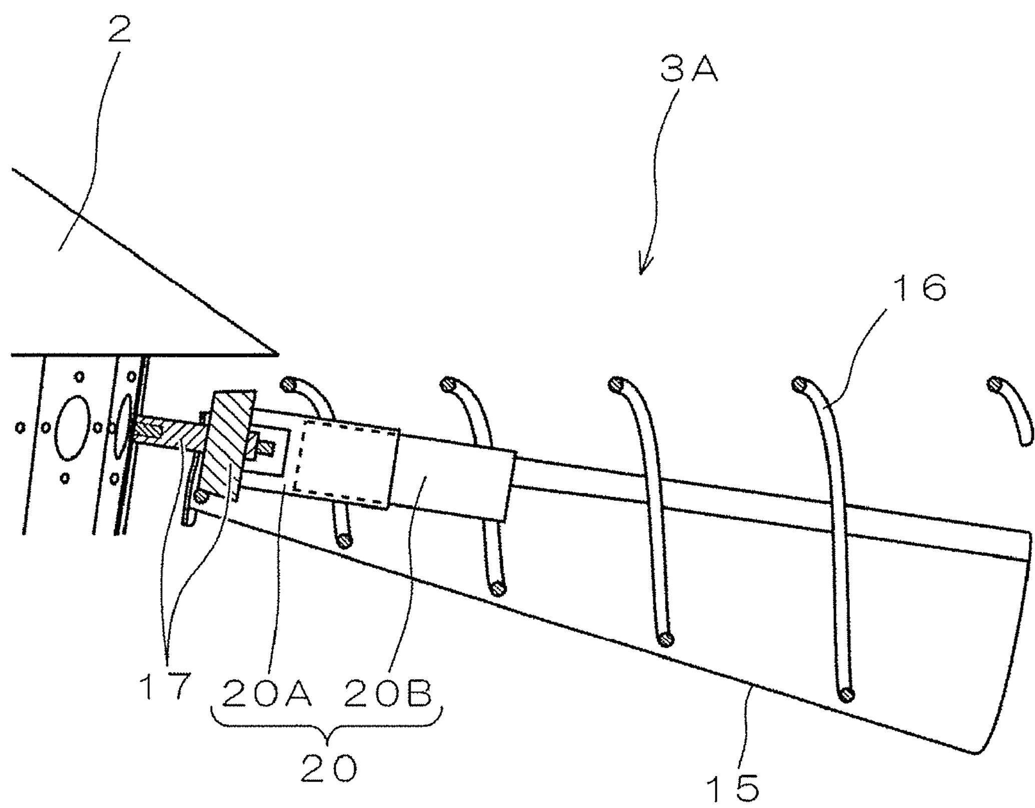
F I G. 2 3

COMBINATION WEIGHING APPARATUS WITH CONVEYING UNIT INCLUDING TROUGH AND SPIRAL MEMBER

CROSS-REFERENCE TO RELATED APPLICATIONS

This application claims priority to Japanese Patent Application No. 2008-122970 filed on May 9, 2008 and Japanese Patent Application No. 2008-142506 filed on May 30, 2008. The entire disclosures of Japanese Patent Application Nos. 2008-122970 and 2008-142506 are hereby incorporated herein by reference.

BACKGROUND OF THE INVENTION

Field of the Invention

The present invention relates to a combination weighing apparatus. Background Information U.S. Patent Application Publication No. 2006/0196701 discloses a conventional combination weighing apparatus that includes a conical dispersion table and a plurality of troughs arranged in a circle around the periphery of the dispersion table. A core is placed in each trough, and a helical transport screw is wound around the external surface of each core. The cores are rotatably driven by motors, whereby the transport screws are also rotated. Product material supplied from the dispersion table to the inside ends of the troughs is pushed by the rotating transport screws and conveyed toward the outside ends of the troughs.

In view of the above, it will be apparent to those skilled in the art from this disclosure that there exists a need for an improved combination weighing apparatus. This invention addresses this need in the art as well as other needs, which will become apparent to those skilled in the art from this disclosure.

SUMMARY OF THE INVENTION

With the conventional combination weighing apparatus disclosed in the above mentioned publication, the cross sections of the troughs have equal diameters at the inside ends and outside ends of the troughs, and spaces are formed between adjacent troughs. Consequently, it is possible for product material to fall through these spaces. In the conventional combination weighing apparatus as described in the above mentioned publication in particular, the product material is conveyed on the cores in an instable manner, and force is applied to lift up the product material in the troughs due to the rotations of the transport screws. Therefore, the possibility that product material will fall is increased. The combination weighing apparatus disclosed in the above mentioned publication has a problem in that no countermeasures are taken with respect to the product material falling through the spaces between adjacent troughs.

Accordingly, one object of the present invention is to provide a combination weighing apparatus including a dispersion unit configured and arranged to radially disperse product material dropped in from above, a plurality of conveying units arranged in around the periphery of the dispersion unit, and a plurality of weighing units arranged around the periphery of the conveying units, wherein product material is prevented from falling through the space between adjacent conveying units.

A combination weighing apparatus according to one aspect includes a dispersion unit, a plurality of conveying units and a plurality of weighing unit. The dispersion unit is configured and arranged to radially disperse product material dropped in from above. The conveying units are arranged around a periphery of the dispersion unit. The weighing units are arranged around a periphery of the conveying units. Each of the conveying units includes a trough having an inside end positioned below the dispersion unit and an outside end positioned above the weighing unit. At least one of the troughs has a cross-sectional diameter that gradually increases generally from the inside end to the outside end so that the one of the troughs and an adjacent one of the troughs are kept in contact with each other substantially all the way from the inside ends to the outside ends. At least one of the conveying units has a spiral member disposed over a bottom surface of the trough. The spiral member is configured and arranged to convey the product material supplied from the dispersion unit toward the outside end of the trough by being rotatably driven.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 1 is a perspective view showing the overall configuration of a combination weighing apparatus according to a first embodiment of the present invention;

FIG. 2 is a top plan view of the combination weighing apparatus according to the first embodiment;

FIG. 3 is a partial perspective view of the combination weighing apparatus showing the area surrounding two conveying mechanisms according to the first embodiment;

FIG. 9 is a partial perspective view of the combination weighing apparatus showing the area surrounding three conveying mechanisms according to the second embodiment;

FIG. 23 is a side view showing the structure of a conveying mechanism according to a fourth modification.

DETAILED DESCRIPTION OF THE PREFERRED EMBODIMENTS

Figure 4:
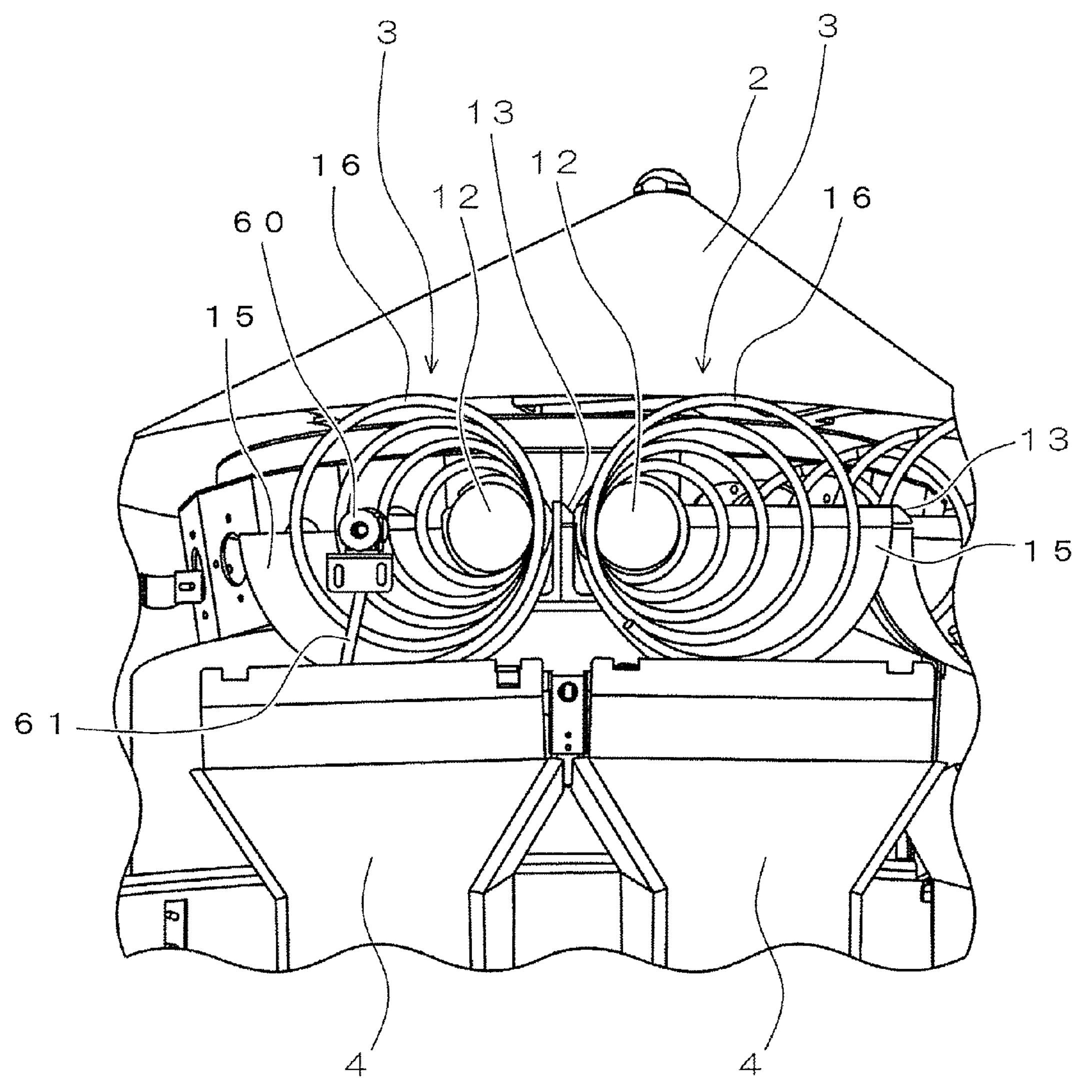
FIG. 4 is a partial front elevational view of the combination weighing apparatus showing the area surrounding two conveying mechanisms according to the first embodiment.

Selected embodiments of the present invention will now be explained with reference to the drawings. It will be apparent to those skilled in the art from this disclosure that the following descriptions of the embodiments are provided for illustration only and not for the purpose of limiting the invention as defined by the appended claims and their equivalents. Elements denoted by the same numerical symbols in different drawings represent identical or corresponding elements.

First Embodiment

Referring initially to FIGS. 1 through 7, a combination weighing apparatus 1 is illustrated in accordance with a first embodiment. FIG. 1 is a perspective view showing the overall configuration of the combination weighing apparatus 1. FIG. 2 is a top plan view of the combination weighing apparatus 1 shown in FIG. 1, as seen from above. The combination weighing apparatus 1 includes a dispersion table 2 (dispersion unit), a plurality of conveying mechanisms 3 (conveying units), a plurality of pool hoppers 4 (part of weighing units), a plurality of weighing hoppers 5 (part of weighing units), and collecting chutes 6, as shown in FIGS. 1 and 2.

The dispersion table 2 is placed in the substantial center of the main body of the combination weighing apparatus 1. The conveying mechanisms 3 are arranged in a generally circular alignment around the periphery of the dispersion table 2. In the present embodiment, the combination weighing apparatus 1 includes twenty conveying mechanisms 3, as shown in FIG. 2. The pool hoppers 4 are arranged in a generally circular alignment around the periphery of the conveying mechanisms 3. In other words, the pool hoppers 4 are generally aligned in a circle. Each pool hopper 4 is placed corresponding to a respective conveying mechanism 3. Therefore, in the present embodiment, the combination weighing apparatus 1 includes twenty pool hoppers 4. The weighing hoppers 5 are aligned below the pool hoppers 4 generally in a circle around the periphery of the conveying mechanisms 3. In other words, the weighing hoppers 5 are generally aligned in a circle. Each weighing hopper 5 is placed corresponding to a respective pool hopper 4. Therefore, in the present embodiment, the combination weighing apparatus 1 includes twenty weighing hoppers 5. The collecting chutes 6 are placed below the weighing hoppers 5.

Figure 5:
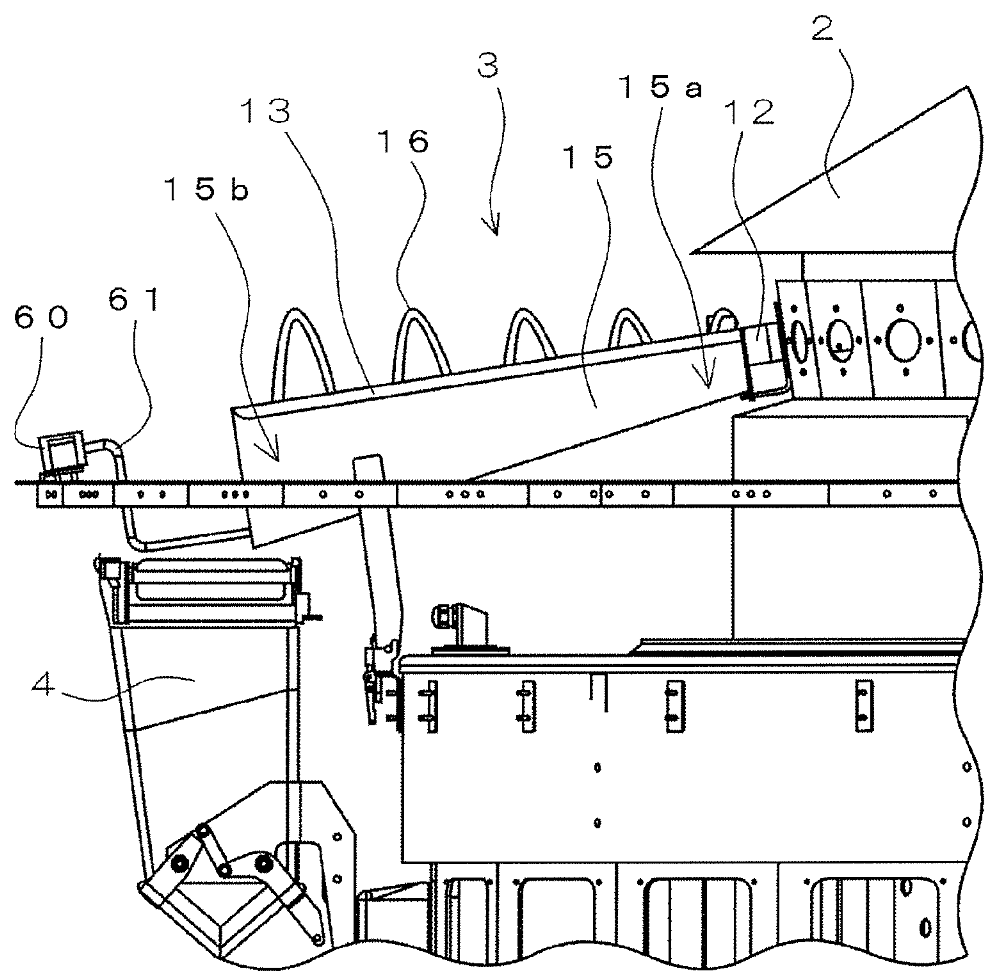
FIG. 5 is a side view showing one conveying mechanism according to the first embodiment.

FIG. 3 is a partial perspective view showing two conveying mechanisms 3 included in the combination weighing apparatus 1, together with the structures surrounding the two conveying mechanisms 3. FIG. 4 is a partial front elevational view showing the two conveying mechanisms 3 included in the combination weighing apparatus 1, together with the structures surrounding the two conveying mechanisms 3. FIG. 5 is a partial side view showing one conveying mechanism 3 included in the combination weighing apparatus 1, together with the structure surrounding the one conveying mechanism 3. The other conveying mechanisms 3 not shown in FIGS. 3 through 5 have the same structure as the conveying mechanisms 3 shown in FIGS. 3 through 5.

Each of the conveying mechanisms 3 includes a trough 15 and a spiral member 16, as shown in FIGS. 3 through 5. Referring to FIG. 5, the inside ends **15*a* of the troughs 15 are positioned below the external peripheral edge of the dispersion table 2, and the outside ends 15*b* of the troughs 15 are positioned above the pool hoppers 4. Since the pool hoppers 4 are positioned above the weighing hoppers 5, the outside ends 15*b* of the troughs 15 are also positioned above the weighing hoppers 5. Referring to FIG. 3, each of the troughs 15 generally has a cylindrical shape (more accurately, a hollow cone shape) with the approximately top half cut away. Therefore, the troughs 15** have bottom surfaces defined as the inside surfaces of the hallow cones, and top openings.

A spiral member 16 is turnably disposed above the bottom surface of each of the troughs 15. The inside ends of the spiral members 16 are fixed to rotating shafts 12. The rotating shafts 12 are rotatably driven by motors, thereby causing the spiral members 16 to be rotatably driven in such a direction that product material is pushed in the troughs 15 from the inside ends **15*a* out toward the outside ends 15*b*. In the present embodiment, cores are not placed inside the internal spaces of the spiral members 16. In other words, the spiral members 16** are coreless spiral members.

Each of the troughs 15 has a flared shape as shown in FIGS. 3 through 5, and the cross-sectional diameter of each of the troughs 15 (the radius of the cross-sectional semicircle when the trough 15 is viewed from the front) gradually increases from the inside end **15*a* to the outside end 15*b*. Adjacent troughs 15 are thereby in contact with each other all the way from the inside ends 15*a* to the outside ends 15*b*. Specifically, the trough 15 has a folded part 13 formed along one side edge of the trough 15, and the folded part 13 covers (or is in contact with) one side edge of the adjacent trough 15, whereby adjacent troughs 15** are arranged side by side without any spaces in between.

Each of the troughs 15 is inclined forward and downward so that the outside end **15*b* is positioned lower than the inside end 15*a*, as shown in FIG. 5. The bottom surface of each of the troughs 15 is thereby defined as a downward slope from the inside end 15*a* to the outside end 15*b***.

Figure 6:
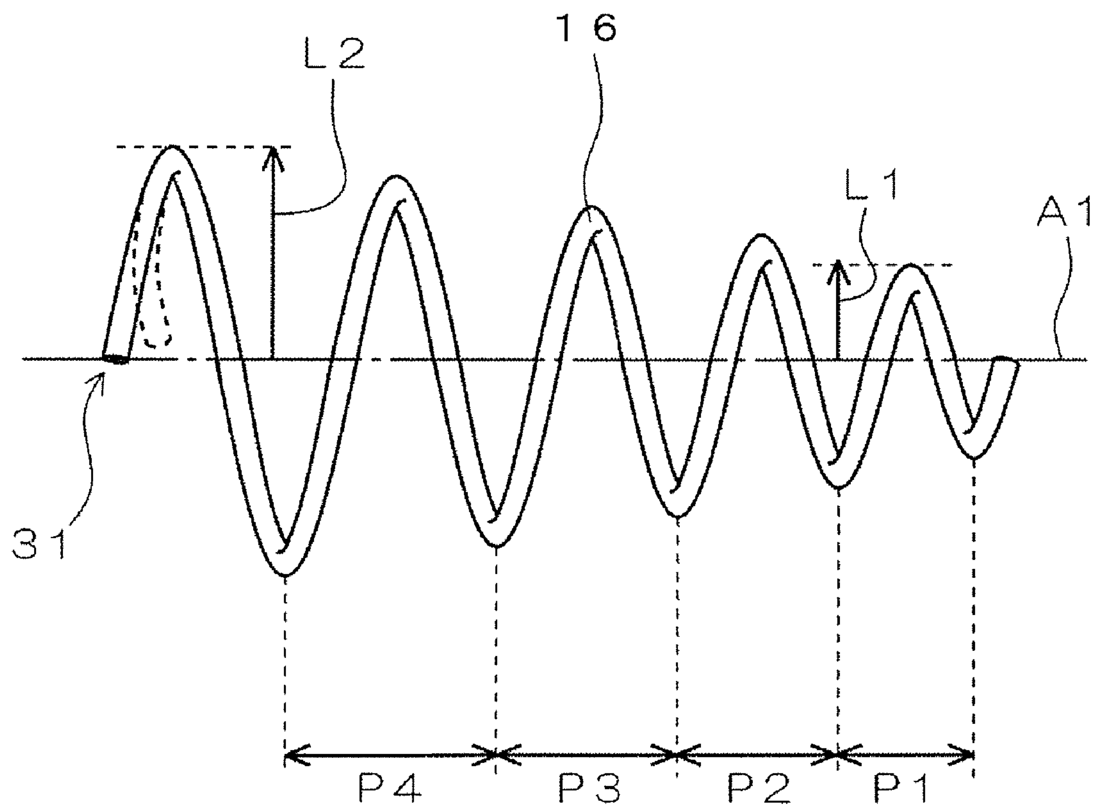
FIG. 6 is a side view of a spiral member according to the first embodiment.

FIG. 6 is a side view showing the structure of the spiral member 16. The spiral member 16 has a shape in which a round bar, a square bar, or another bar member is twisted or formed into a helical shape. The spiral member 16 also has a flared spiral structure that widens in accordance with the flared shape of the trough 15. In other words, the spiral diameter L2 of the spiral member 16 (the radius of the circle seen when the spiral member 16 is viewed along the center axis A1 from a distance) in the outside end (the left end in FIG. 6) is set so as to be greater than the spiral diameter L1 of the spiral member 16 in the inside end (the right end in FIG. 6).

The spiral pitch of the spiral member 16 is set so as to gradually increase from the inside end toward the outside end. Therefore, the spiral pitch of the spiral member 16 in the outside end is set so as to be greater than the spiral pitch of the spiral member 16 in the inside end. The spiral pitches P1 to P4 shown in FIG. 6 have the relationship P1<P2<P3<P4.

The outside end 31 of the spiral member 16 may be significantly bent toward the center axis A1, as shown by the dashed lines in FIG. 6. Abrasion of the bottom surface of the trough 15 due to contact with the outside end 31 can thereby be avoided. The centrifugal force in the outside end 31 decreases because the distance between the outside end 31 and the center axis A1 is reduced. As a result, the effects of the centrifugal force in the outside end 31 that acts as disturbance noise for the load cell or other weighing elements can be reduced.

The following is a description, made with reference to FIGS. 1 through 5, of the action of the combination weighing apparatus 1. Product material as the object to be weighed (e.g., raw meat or other foodstuffs) is dropped from above the dispersion table 2 onto the center of the top surface of the dispersion table 2. The product material dropped onto the dispersion table 2 is dispersed in a radial manner by the rotatably driven dispersion table 2, and the product material is discharged from the external peripheral edge of the dispersion table 2 and supplied to the inside ends 15*a* of the troughs 15 from above.

In the conveying mechanisms 3, the spiral members 16 are rotatably driven in an intermittent manner. Therefore, the product material supplied to the inside ends 15*a* slides down the downward slopes while being pushed by the rotatably driven spiral members 16, whereby the product material is conveyed over the bottom surfaces of the troughs 15 from the inside ends 15*a* to the outside ends 15*b*. In cases in which the size of the product material is greater than the spiral pitches P1 (see FIG. 6) in the inside ends, the product material supplied from the dispersion table 2 is initially conveyed on top of the spiral members 16. However, since the spiral pitches gradually increase toward the outside ends, the product material on top of the spiral members 16 falls through one of the spaces between the spiral pitches P2 to P4, and is thereafter conveyed onto the bottom surfaces of the troughs 15.

The product material discharged from the conveying mechanisms 3 is supplied to the pool hoppers 4 and is temporarily held inside the pool hoppers 4. The product material discharged from the pool hoppers 4 is supplied to the weighing hoppers 5 and is temporarily stored inside the weighing hoppers 5, where the product material is weighed by load cells or other weighing elements (not shown). A calculation is then made to select one hopper or a combination of some hoppers among all the weighing hoppers 5 with the product material, the total weight value of the selected one or some hopper(s) being the same as or is the closest to a target weight. And the product material held in the selected one or some weighing hopper(s) 5 is then discharged. The product material discharged from the weighing hoppers 5 is collected by the collecting chutes 6 and is discharged from the combination weighing apparatus 1 toward downstream devices (not shown).

Thus, with the combination weighing apparatus 1 according to the present embodiment, adjacent troughs 15 are in contact with each other all the way from the inside ends 15*a* to the outside ends 15*b*. Therefore, even in situations in which product material spills over laterally from one trough 15 (in the circumferential direction of the circle formed by the aligned plurality of conveying mechanisms 3), the spilled product material will be supplied into the adjacent trough 15. As a result, the product material can be prevented from falling through spaces between adjacent troughs 15.

Figure 7:
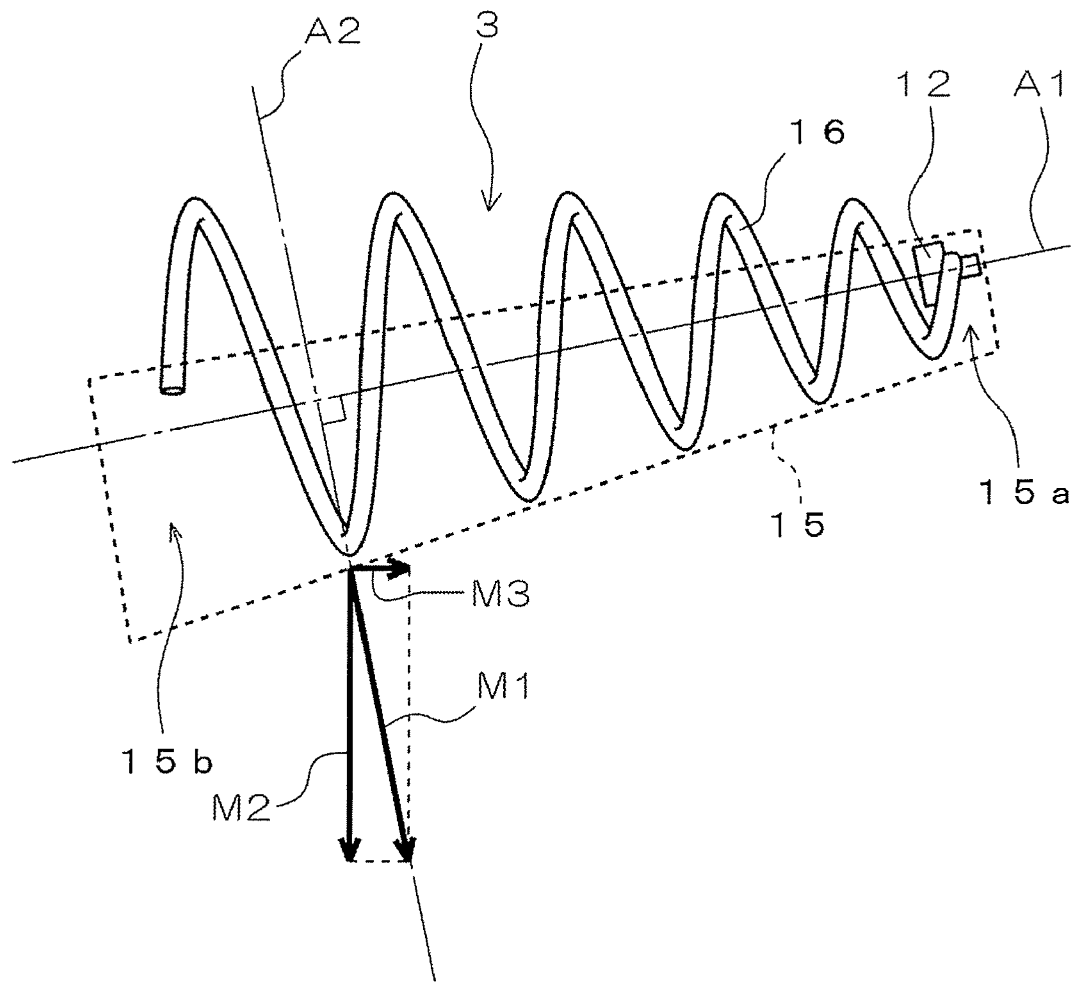
FIG. 7 is a side view of the spiral member when the spiral member is disposed at an incline according to the first embodiment.

With the combination weighing apparatus 1 according to the present embodiment, the troughs 15 are disposed at an incline with respect to the horizontal direction, and the spiral members 16 are thereby also disposed at an incline. FIG. 7 is a view showing a spiral member 16 disposed at an incline. The vibration caused by the rotation of the spiral member 16 acts as disturbance noise for the load cell or other weighing elements, but this disturbance noise can be reduced by disposing the spiral member 16 at an incline. In other words, by disposing the spiral member 16 at an incline as shown in FIG. 7, the direction in which centrifugal force M1 acts on the spiral member 16 (the direction of an axis A2 perpendicular to the center axis A1) is also inclined with respect to the vertical direction. The centrifugal force M1 thereby has a vertical component M2 and a horizontal component M3, of which only the vertical component M2 acts as disturbance noise for the weighing elements. The vertical component M2 herein is less than the centrifugal force M1. Therefore, the disturbance noise for the weighing elements can be reduced in comparison with an apparatus in which the spiral members 16 are disposed horizontally and the centrifugal force M1 acts directly in the vertical direction.

Moreover, the troughs 15 are disposed at an incline so that the outside ends 15*b* are positioned lower than the inside ends 15*a*. In other words, it is easier for the product material to advance from the inside ends 15*a* to the outside ends 15*b* by sliding down. As a result, the efficiency with which the product material is conveyed by the conveying mechanisms 3 can be increased.

With the combination weighing apparatus 1 according to the present embodiment, the spiral pitch P4 of the spiral member 16 in the outside end is set so as to be greater than the spiral pitch P1 in the inside end, as shown in FIG. 6. Therefore, in the outside ends 15*b* of the troughs 15, the product material can be scattered in the length directions of the troughs 15 (directions parallel to the center axes A1). In other words, the product material can be scattered in the outside ends 15*b* even if the product material becomes tightly packed in the inside ends 15*a*. As a result, it is possible to accurately and precisely control the amount of product material supplied from the conveying mechanisms 3 to the pool hoppers 4 (and the weighing hoppers 5).

Similarly, with the combination weighing apparatus 1 according to the present embodiment, the spiral diameter L2 of the spiral member 16 in the outside end is set so as to be greater than the spiral diameter L1 in the inside end, as shown in FIG. 6. Therefore, in the outside ends 15*b* of the troughs 15, product material can be scattered also in the width directions of the troughs 15 (directions perpendicular to the center axes A1). As a result, since the effects of scattering the product material are further increased, it is possible to more accurately and precisely control the amount of product material supplied from the conveying mechanisms 3 to the pool hoppers 4 (and the weighing hoppers 5).

According to the present embodiment, product material is prevented from falling through the space between adjacent conveying units.

Second Embodiment

Referring now to FIGS. 8-19, a combination weighing apparatus 101 in accordance with a second embodiment will now be explained. In view of the similarity between the first and second embodiments, the parts of the second embodiment that are identical or equivalent to the parts of the first embodiment will be given the same reference numerals as the parts of the first embodiment. Moreover, the descriptions of the parts of the second embodiment that are identical or equivalent to the parts of the first embodiment may be omitted for the sake of brevity.

Figure 8:
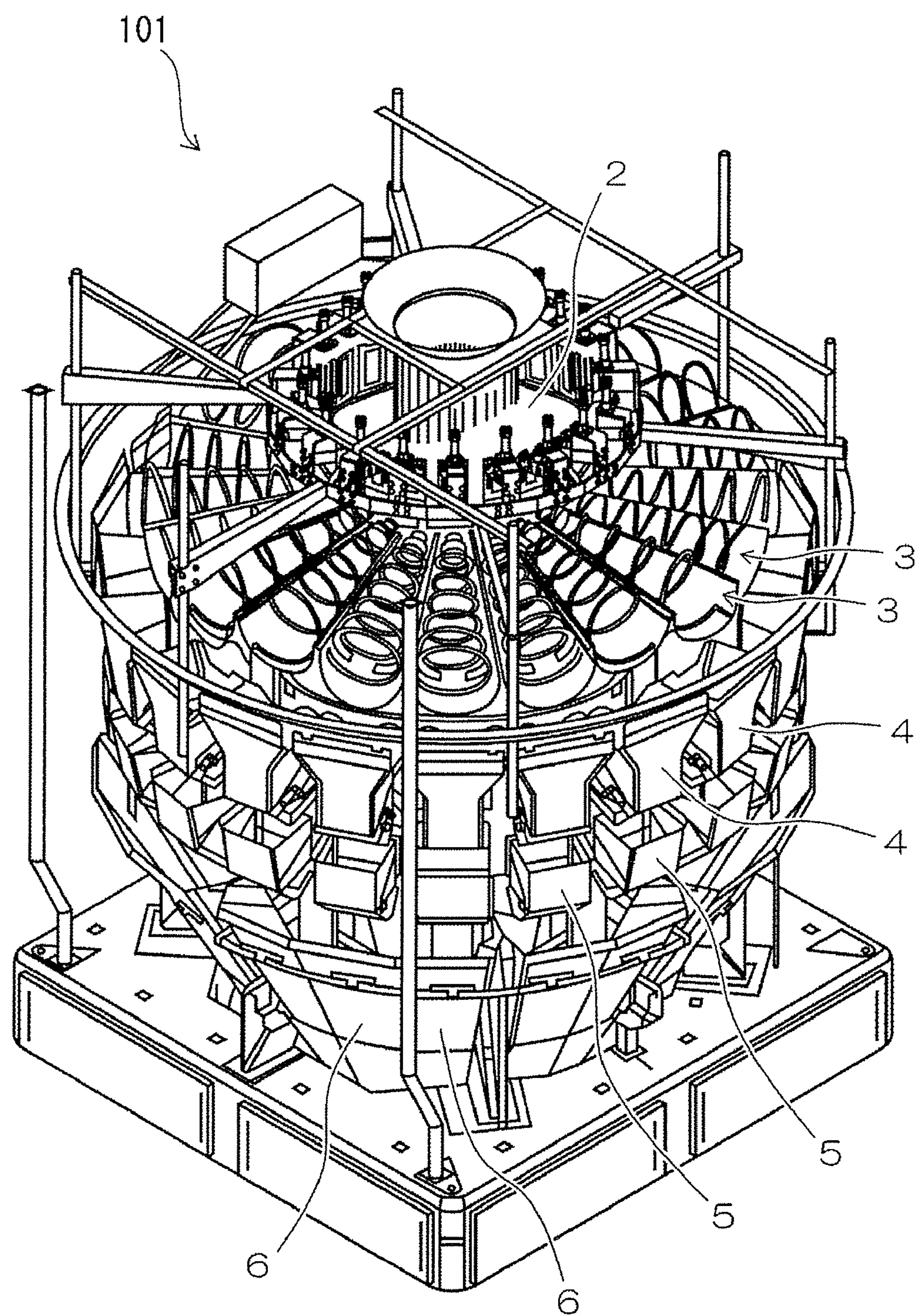
FIG. 8 is a perspective view showing the overall configuration of a combination weighing apparatus according to a second embodiment of the present invention.

FIG. 8 is a perspective view showing the overall configuration of the combination weighing apparatus 101 according to the second embodiment. The combination weighing apparatus 101 according to the second embodiment differs from the combination weighing apparatus 1 according to the first embodiment mainly in that one or combination of conveying mechanisms 3A to 3C described hereinafter is used instead of the conveying mechanisms 3. The following is mainly a description of the conveying mechanisms 3A to 3C as the difference from the combination weighing apparatus 1 according to the first embodiment.

Figure 10:
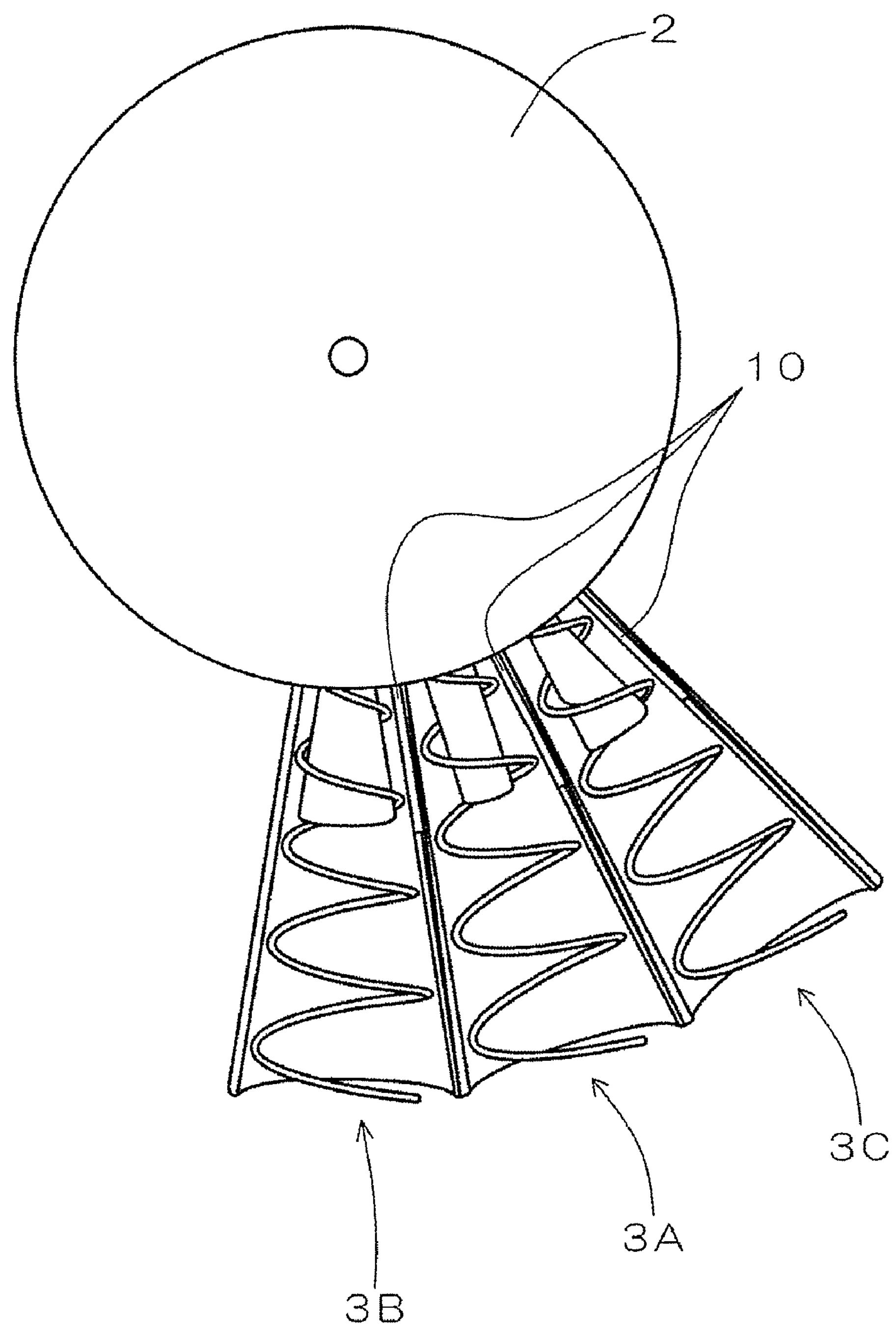
FIG. 10 is a partial top plan view showing the area surrounding the three conveying mechanisms shown in FIG. 9 according to the second embodiment.

FIGS. 9 and 10 are, respectively, a perspective view and a top view showing three conveying mechanisms 3A to 3C and the surrounding structures of the combination weighing apparatus 101. In FIGS. 9 and 10, three pattern variations (first to third examples) of the conveying mechanism are shown respectively as conveying mechanisms 3A, 3B, and 3C. It is preferable for one structure (for example, any one structure of the conveying mechanisms 3A, 3B, and 3C) to be applied to all of the conveying mechanisms provided in the combination weighing apparatus 101. However, it is also possible to use a plurality of structures (structures of the conveying mechanisms 3A, 3B, and 3C) together in the combination weighing apparatus 101 as in the present embodiment.

Conveying Mechanism 3A

Figure 11:
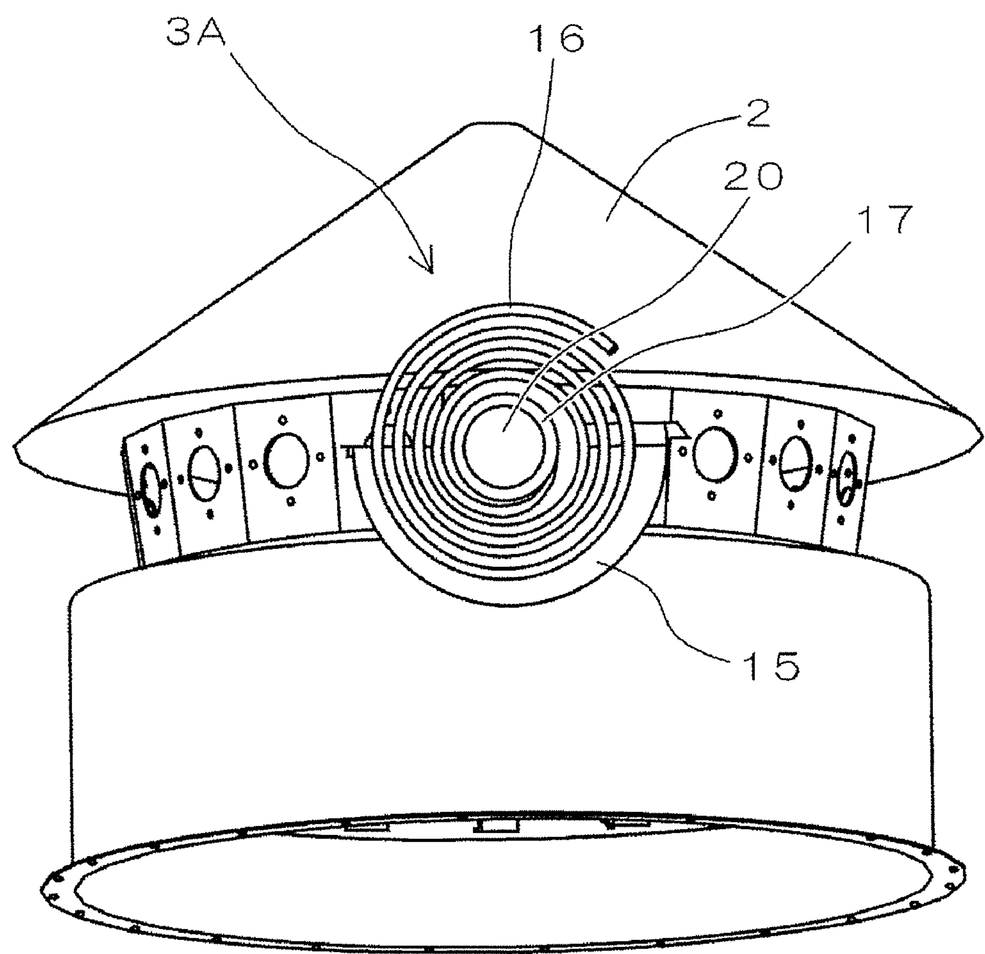
FIG. 11 is a partial front elevational view of the combination weighing apparatus showing the area surrounding a first example of the conveying mechanism according to the second embodiment.
Figure 12:
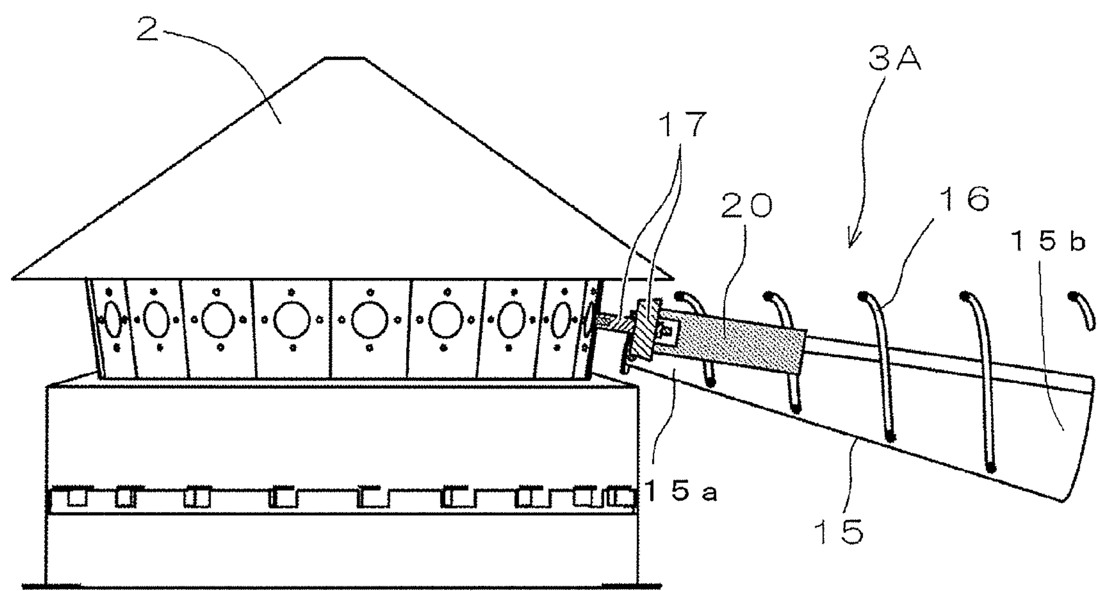
FIG. 12 is a side view showing the area surrounding the conveying mechanism shown in FIG. 11 according to the second embodiment.

FIGS. 11 and 12 are, respectively, a front view and a side view (part of FIG. 12 is a cross-sectional view) showing the conveying mechanism 3A shown in FIGS. 9 and 10 together with the surrounding structure. The conveying mechanism 3A has a trough 15, a spiral member 16, and a cylinder member 20 (core member), as shown in FIGS. 11 and 12. Referring to FIG. 12, the inside end 15*a* of the trough 15 (the left end in FIG. 12) is positioned below the external peripheral edge of the dispersion table 2. The outside end 15*b* of the trough 15 (the right end in FIG. 12) is positioned above the pool hopper 4 (not shown in FIG. 12). Since the pool hopper 4 is positioned above the weighing hopper 5, the outside end 15*b* of the trough 15 is positioned above the weighing hopper 5 as well. The trough 15 generally has a cylindrical shape (more accurately, a hollow cone shape) with substantially the top half cut away. Therefore, the trough 15 has a bottom surface defined as the inside surface of the cylinder, and a top opening. The bottom surface of the trough 15 is defined as a product material conveying surface.

The spiral member 16 is turnably disposed above the bottom surface of the trough 15. The inside end of the spiral member 16 is fixed to a rotating shaft 17. The rotating shaft 17 is rotatably driven by a motor, whereby the spiral member 16 is rotatably driven in such a direction that the product material is pushed in the trough 15 from the inside end 15*a* out towards the outside end 15*b*.

The trough 15 has a flared shape as shown in FIGS. 9 through 12, and the cross-sectional diameter of the trough 15 (the radius of the cross-sectional semicircle when the trough 15 is viewed from the front) gradually increases from the inside end 15*a* to the outside end 15*b*. Adjacent two troughs 15 (those in the conveying mechanism 3A and conveying mechanism 3B described below, or those in the conveying mechanisms 3A and conveying mechanism 3C described below) are thereby in contact with each other all the way from the inside ends 15*a* to the outside ends 15*b*. The trough 15 is also inclined forward and downward so that the outside end 15*b* is positioned lower than the inside end 15*a*, as shown in FIG. 12. The bottom surface of the trough 15 is thereby defined as a downward slope from the inside end 15*a* to the outside end 15*b*. The spiral member 16 has a flared spiral structure corresponding to the flared shape of the trough 15. In other words, the diameter of the opening of the spiral member 16 in the outside end 15*b* (the radius of the circle seen when the spiral member 16 is viewed along the center axis of the spiral member 16 from a distance) is set so as to be greater than the diameter of the opening of the spiral member 16 in the inside end 15*a*.

The cylinder member 20 is set up along the same axis as the spiral member 16 in the internal space of the spiral member 16. In the example shown in FIG. 12, the cylinder member 20 extends from the inside end 15*a* of the trough 15 to a point somewhat inward of the center of the trough 15. The diameter of the cross-sectional circle of the cylinder member 20 is the same from the inside end to the outside end. The cylinder member 20 may be a hollow column (in other words, a cylinder).

Figure 13:
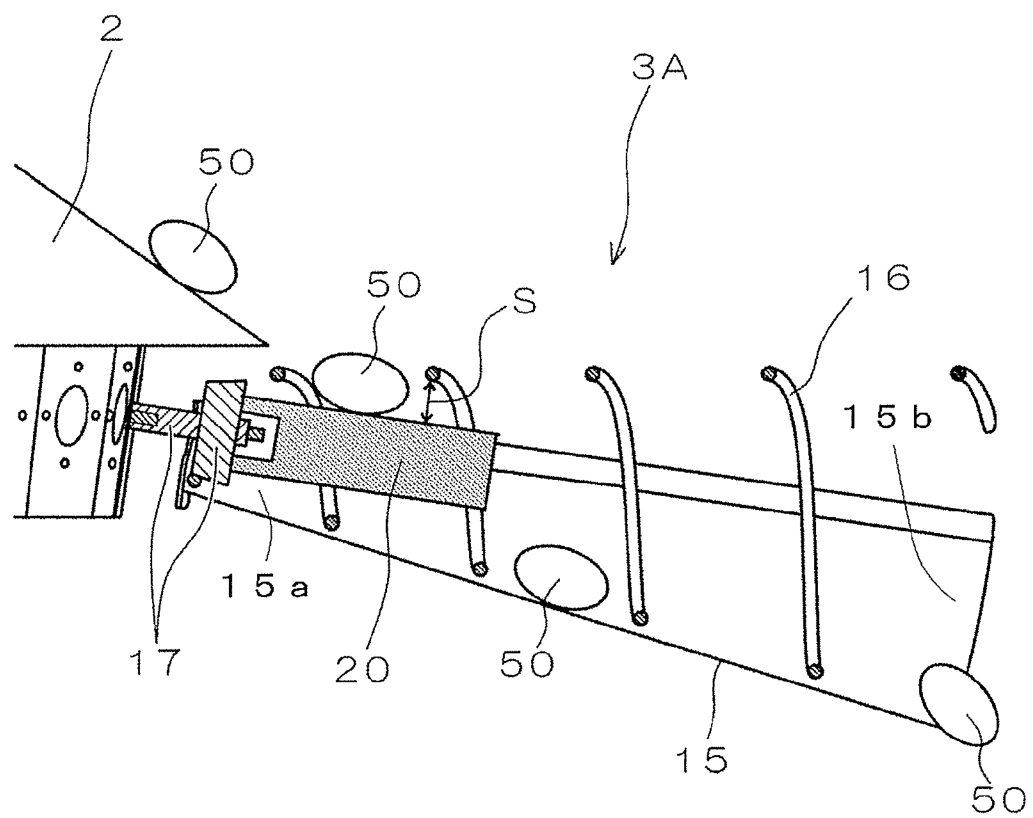
FIG. 13 is an enlarged partial side view showing the manner in which product material is conveyed by the conveying mechanism shown in FIGS. 11 and 12 according to the second embodiment.

FIG. 13 is a side view (part of which is a cross-sectional view) showing the manner in which product material 50 is conveyed by the conveying mechanism 3A. The action of the combination weighing apparatus 101 is described hereinbelow with reference to FIGS. 8 through 13. The product material 50 (e.g., raw meat or other foodstuffs) as the objects to be weighed is dropped from above the dispersion table 2 onto the center of the top surface of the dispersion table 2. The product material 50 dropped onto the dispersion table 2 is dispersed in a radial manner by the rotatably driven dispersion table 2, and the product material 50 is discharged from the external peripheral edge of the dispersion table 2.

Referring to FIG. 13, the product material 50 discharged from the dispersion table 2 is first supplied not onto the bottom surface of the trough 15 (product material conveying surface), but onto the cylinder member 20, where the product material 50 is temporarily held. In other words, the cylinder member 20 functions as a regulating unit configured and arranged to regulate the supply of the product material 50 supplied from the dispersion table 2 to the conveying mechanism 3A, onto the product material conveying surface. In other words, the cylinder member 20 regulates the flow of product material 50 conveyed from the dispersion table 2 onto the bottom surface of the trough 15.

Rods 10 are set up above the borders between adjacent conveying mechanisms 3 (including the conveying mechanisms 3A, 3B and 3C), as shown in FIG. 9. The rods 10 help the product material 50 to be held on top of the cylinder member 20 and the conical member 30 and 40 described below.

In the conveying mechanism 3A, the spiral member 16 is rotatably driven in an intermittent manner. Therefore, the product material 50 held on the cylinder member 20 is conveyed toward the distal end of the cylinder member 20 (the right end in FIG. 13) while being pushed by the rotatably driven spiral member 16. The product material 50 is eventually dropped off the distal end of the cylinder member 20 and supplied onto the bottom surface of the trough 15.

The product material supplied onto the bottom surface of the trough 15 slides down the downward slope while being pushed by the rotatably driven spiral member 16, and is thereby conveyed on the bottom surface of the trough 15 toward the outside end 15*b*. The product material 50 is eventually discharged from the distal end of the trough 15.

The product material 50 discharged from the conveying mechanism 3A is supplied to the pool hopper 4 and is temporarily held in the pool hopper 4. The product material 50 discharged from the pool hopper 4 is supplied to the weighing hopper 5 and temporarily held in the weighing hopper 5. The product material is weighed by a load cell or other weighing units (not shown) in the weighing hopper 5.

Similarly, product material 50 is also supplied to all the other weighing hoppers 5, via the dispersion table 2, all the other conveying mechanisms 3 (including the conveying mechanisms 3B and 3C described below) and all the other pool hoppers 4. And the product material 50 is also temporarily held and weighted in all the other weighing hoppers 5.

A calculation is then made to select one hopper or a combination of some hoppers among all the weighing hoppers 5 with the product material, the total weight value of the selected one or some hopper(s) being the same as or is the closest to a target weight. And the product material 50 held in the selected one or some weighing hoppers 5 is then discharged. The product material 50 discharged from the weighing hoppers 5 is collected by the collecting chutes 6 and is discharged from the combination weighing apparatus 101 toward downstream devices (not shown).

Conveying Mechanism 3B

Figure 14:
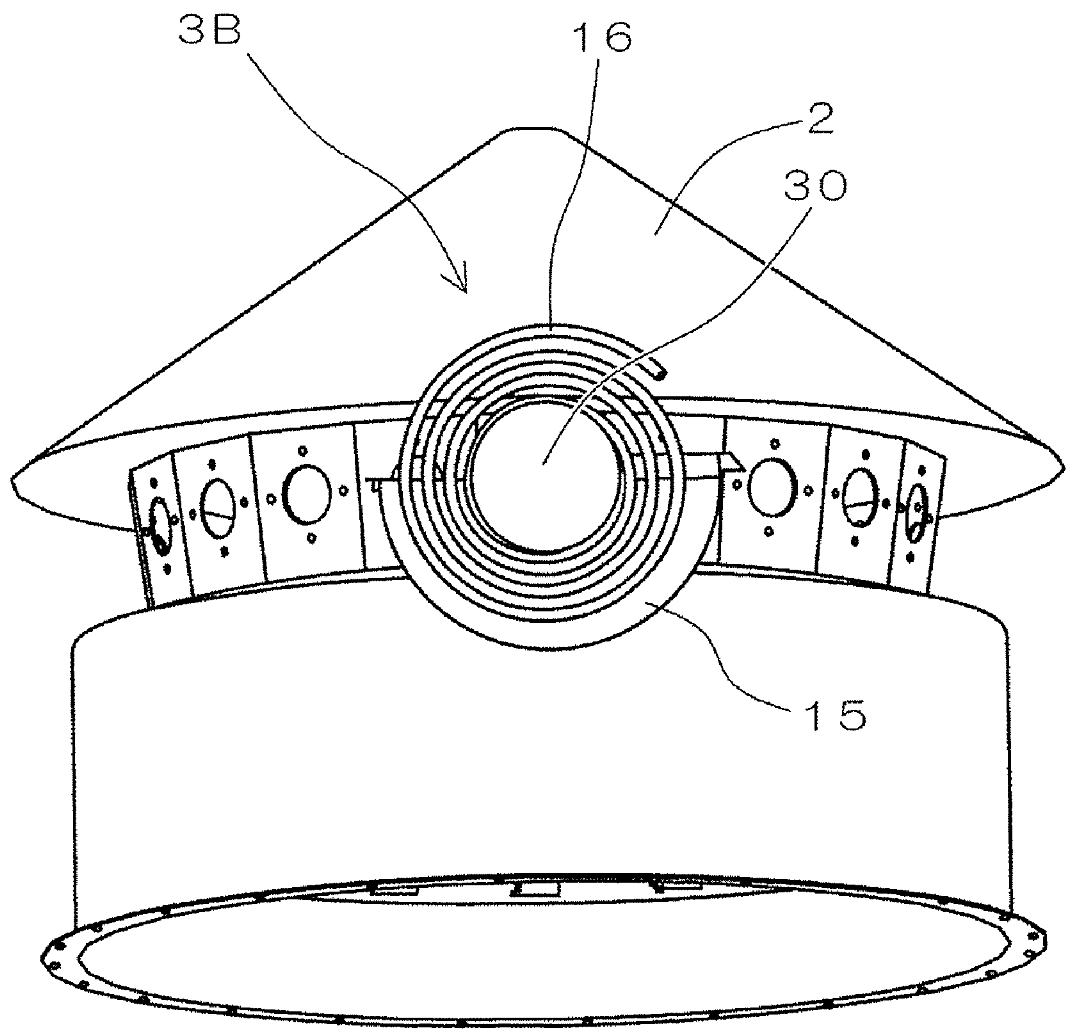
FIG. 14 is a partial front elevational view of the combination weighing apparatus showing the area surrounding a second example of the conveying mechanism according to the second embodiment.
Figure 15:
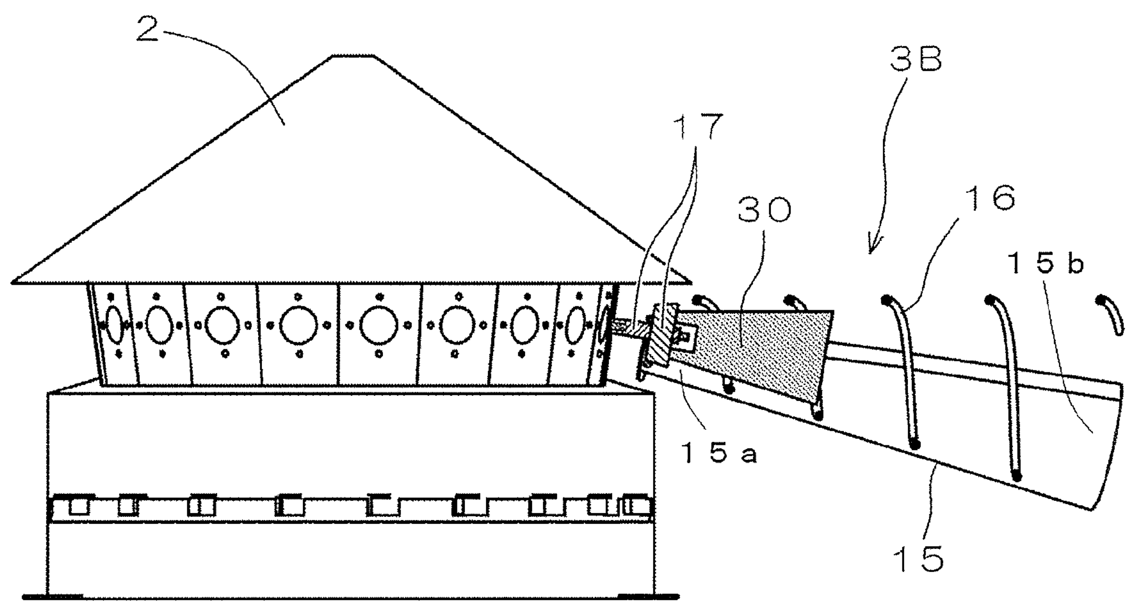
FIG. 15 is a side view showing the area surrounding the conveying mechanism shown in FIG. 14 according to the second embodiment.

FIGS. 14 and 15 are, respectively, a front view and a side view (part of FIG. 15 is a cross-sectional view) showing the conveying mechanism 3B shown in FIGS. 9 and 10 together with the surrounding structure. The conveying mechanism 3B has the trough 15, the spiral member 16, and a generally cylindrical member, or more accurately, a conical member 30 (core member), as shown in FIGS. 14 and 15. The structures of the trough 15 and spiral member 16 are the same as those of the conveying mechanism 3A shown in FIGS. 11 and 12.

The conical member 30 is set up along the same axis as the spiral member 16 in the internal space in the spiral member 16. In the example shown in FIG. 15, the conical member 30 extends from the inside end 15*a* of the trough 15 to a point somewhat inward of the center of the trough 15. The conical member 30 has a flared shape corresponding to (resembling) the flared shape of the spiral member 16. In other words, the diameter of the cross-sectional circle of the conical member 30 gradually increases from the inside end toward the outside end. The conical member 30 may be a hollow column (in other words, a hollow cone).

Figure 16:
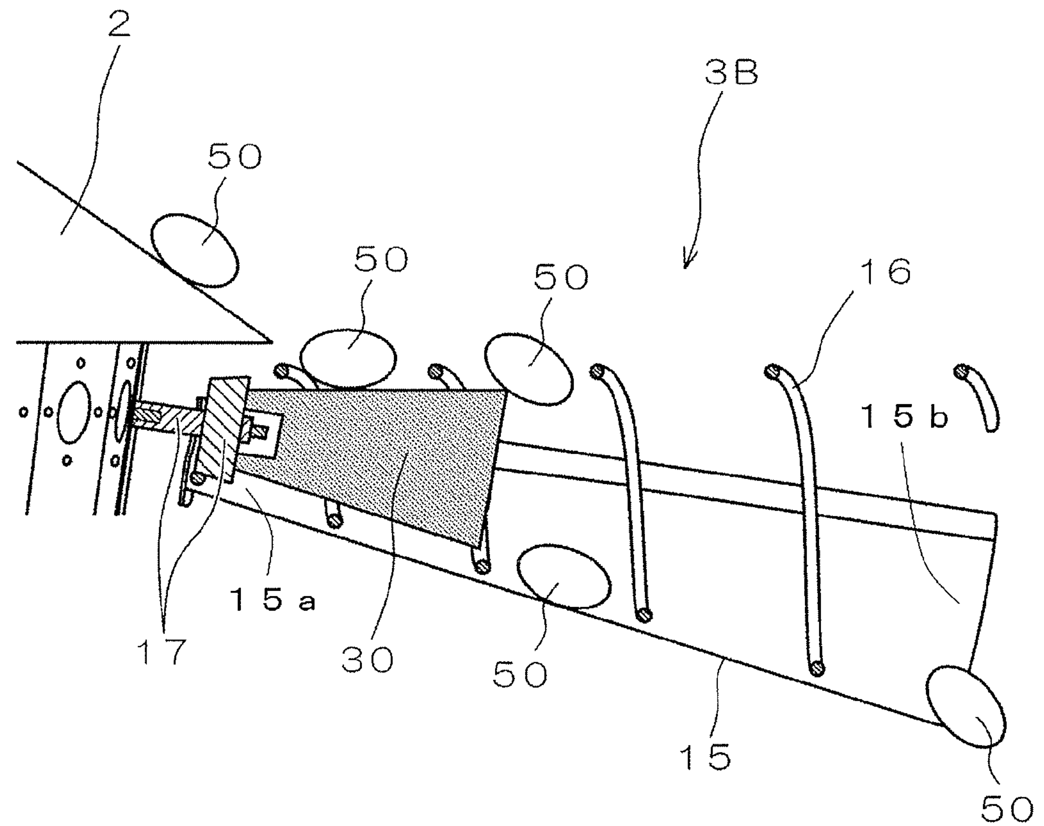
FIG. 16 is an enlarged partial side view showing the manner in which product material is conveyed by the conveying mechanism shown in FIGS. 14 and 15 according to the second embodiment.

FIG. 16 is a side view (part of which is a cross-sectional view) showing the manner in which the product material 50 is conveyed by the conveying mechanism 3B. The product material 50 discharged from the dispersion table 2 is first supplied not onto the bottom surface of the trough 15 (the product material conveying surface), but onto the conical member 30, where the product material is temporarily held. Specifically, the conical member 30 functions as a regulating unit configured and arranged to regulate the supply of the product material 50 supplied from the dispersion table 2 to the conveying mechanism 3B, onto the product material conveying surface. In other words, the conical member 30 regulates the flow of product material 50 supplied from the dispersion table 2 onto the bottom surface of the trough 15.

In the conveying mechanism 3B, the spiral member 16 is rotatably driven in an intermittent manner. Therefore, the product material 50 held on the conical member 30 is conveyed toward the distal end of the conical member 30 (the right end in FIG. 16) while being pushed by the rotatably driven spiral member 16. The product material 50 is eventually dropped off the distal end of the conical member 30 and supplied onto the bottom surface of the trough 15.

The product material 50 supplied onto the bottom surface of the trough 15 slides down the downward slope while being pushed by the rotatably driven spiral member 16, and the product material is thereby conveyed on the bottom surface of the trough 15 toward the outside end 15*b*. The product material 50 is eventually discharged from the distal end of the trough 15. The action from this point onward is the same as that described above.

Conveying Mechanism 3C

Figure 17:
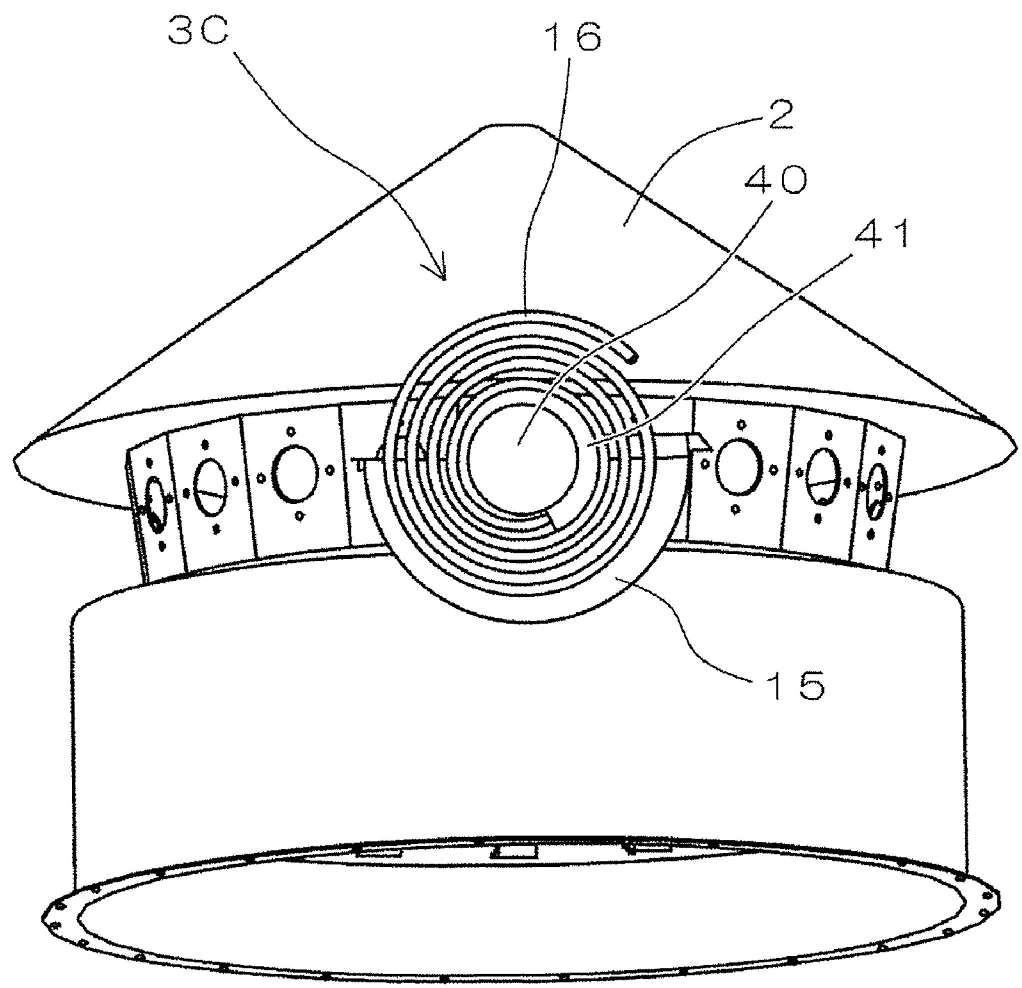
FIG. 17 is a partial front elevational view showing the area surrounding a third example of the conveying mechanism according to the second embodiment.
Figure 18:
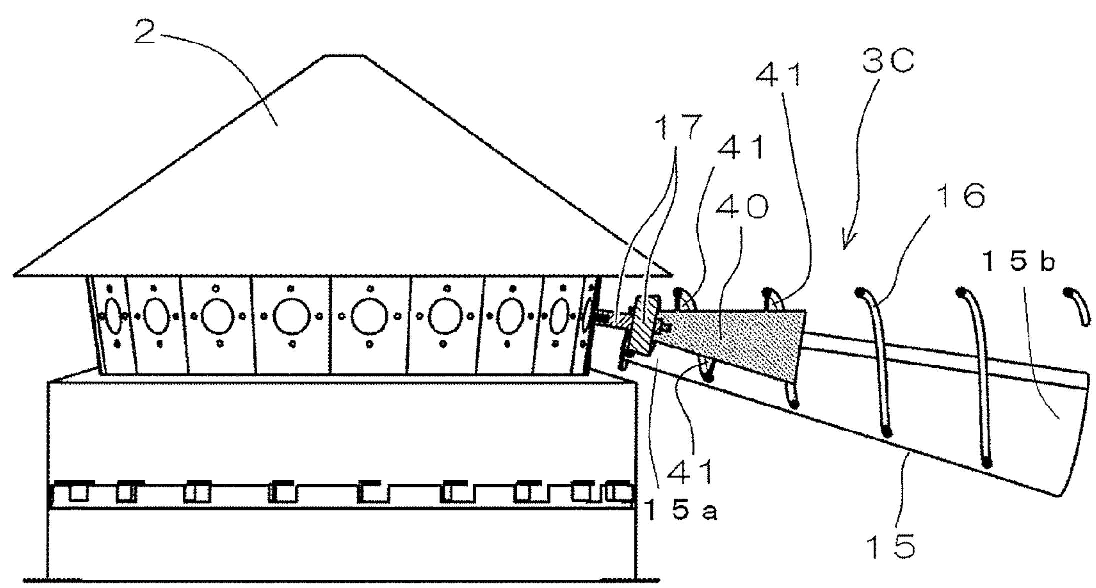
FIG. 18 is a side view showing the area surrounding the conveying mechanism shown in FIG. 17 according to the second embodiment.

FIGS. 17 and 18 are, respectively, a front view and a side view (part of FIG. 18 is a cross-sectional view) showing the conveying mechanism 3C shown in FIGS. 9 and 10 together with the surrounding structure. The conveying mechanism 3C has the trough 15, the spiral member 16, and a generally cylindrical member, or more accurately, a conical member 40 (core member), as shown in FIGS. 17 and 18. The structures of the trough 15 and spiral member 16 are the same as those of the conveying mechanism 3A shown in FIGS. 11 and 12.

The conical member 40 is set up along the same axis as the spiral member 16 in the internal space in the spiral member 16. In the example shown in FIG. 18, the conical member 40 extends from the inside end 15*a* of the trough 15 to a point somewhat inward of the center of the trough 15. The conical member 40 has a flared shape corresponding to (resembling) the flared shape of the spiral member 16. In other words, the diameter of the cross-sectional circle of the conical member 40 gradually increases from the inside end toward the outside end. A plate-shaped member 41 rising from the external surface of the conical member 40 is provided in the space between the spiral member 16 and the conical member 40. The conical member 40 may be a hollow column (in other words, a hollow cone).

Figure 19:
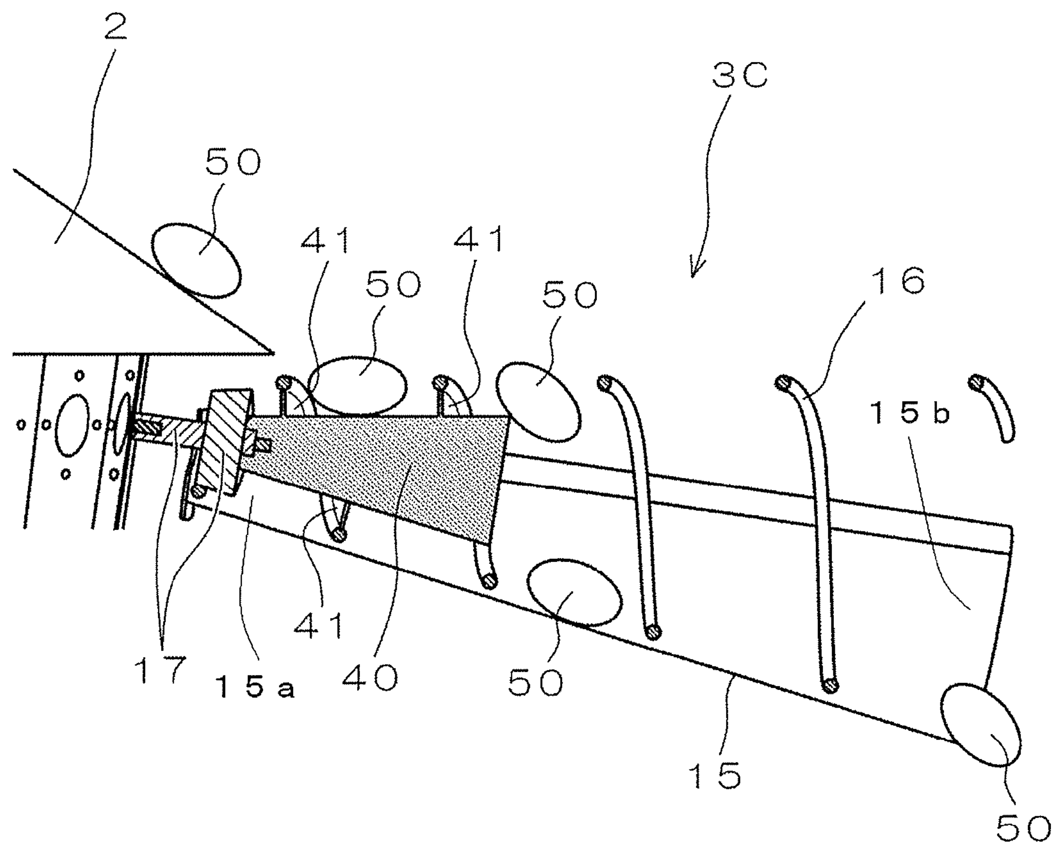
FIG. 19 is an enlarged side view showing the manner in which product material is conveyed by the conveying mechanism shown in FIGS. 17 and 18 according to the second embodiment.

FIG. 19 is a side view (part of which is a cross-sectional view) showing the manner in which the product material 50 is conveyed by the conveying mechanism 3C. The product material 50 discharged from the dispersion table 2 is first supplied not onto the bottom surface of the trough 15 (the product material conveying surface), but onto the conical member 40, where the product material is temporarily held. Specifically, the conical member 40 functions as a regulating unit configured and arranged to regulate the supply of the product material 50 supplied from the dispersion table 2 to the conveying mechanism 3C, onto the product material conveying surface. In other words, the conical member 40 regulates the flow of product material 50 conveyed from the dispersion table 2 onto the bottom surface of the trough 15.

In the conveying mechanism 3C, the spiral member 16 is rotatably driven in an intermittent manner. Therefore, the product material 50 held on the conical member 40 is conveyed toward the distal end of the conical member 40 (the right end in FIG. 19) while being pushed by the rotatably driven spiral member 16 and the plate-shaped member 41. The presence of the plate-shaped member 41 causes the force for conveying the product material 50 to be greater than in the conveying mechanisms 3A, 3B. The product material 50 is eventually dropped off the distal end of the conical member 40 and supplied onto the bottom surface of the trough 15.

The product material 50 supplied onto the bottom surface of the trough 15 slides down the downward slope while being pushed by the rotatably driven spiral member 16, and the product material is thereby conveyed on the bottom surface of the trough 15 toward the outside end 15*b*. The product material 50 is eventually discharged from the distal end of the trough 15. The action from this point onward is the same as that described above.

Effects of Combination Weighing Apparatus 101

A combination weighing apparatus commonly includes a dispersion table, a plurality of troughs arranged in a circle around the periphery of the dispersion table, a plurality of pool hoppers disposed below the outside ends of the troughs, and weighing hoppers disposed below the pool hoppers. Product material dropped in from above the dispersion table is dispersed in a radial manner by the dispersion table and supplied to the inside ends of the troughs. The product material supplied to the troughs is conveyed from the inside ends to the outside ends over product material conveying surfaces, which are the bottom surfaces of the troughs, and the product material is discharged from the outside ends of the troughs. The product material discharged from the troughs is supplied to the pool hoppers and temporarily held in the pool hoppers. The product material discharged from the pool hoppers is supplied to the weighing hoppers and temporarily held in the weighing hoppers, and the product material is weighed by load cells or other weighing units. A hopper combination whose weight value is the same as or is the closest to a target weight is then selected, and the product material discharged from one or a plurality of the selected weighing hoppers is collected and discharged toward downstream devices.

With a combination weighing apparatus, the amount of product material held in the weighing hoppers must be reduced in cases in which the product material target weight is comparatively small. Therefore, the amount of product material held in the pool hoppers must be reduced, and the amount of product material supplied to the pool hoppers from the troughs must therefore be reduced as well.

The combination weighing apparatus 101 according to the present embodiment is designed in view of these circumstances, and it is possible to avoid or prevent the product material from being supplied to the weighing hoppers 5 in an excessive amount by limiting the amount of product material discharged from the troughs 15.

More specifically, with the combination weighing apparatus 101 according to the present embodiment, the supply of product material 50 from the dispersion table 2 to the product material conveying surfaces of the troughs 15 is regulated by the cylinder member 20, the conical member 30 and/or the conical member 40. In other words, at least part of the product material 50 supplied from the dispersion table 2 is not immediately supplied onto the product material conveying surfaces of the troughs 15, but instead is temporarily held on the cylinder member 20, the conical member 30 and the conical member 40 in the conveying mechanisms 3A to 3C. Therefore, it is possible to limit the amount of product material 50 discharged substantially at the same time, i.e., in lumps, from the troughs 15. As a result, it is possible to avoid or prevent product material 50 from being supplied to the weighing hoppers 5 in an excessive amount in cases in which the product material target weight is comparatively small.

With the combination weighing apparatus 101 according to the present embodiment, spaces S whose size is about half the height of the product material 50 are formed between the cylinder member 20, the conical member 30 and the conical member 40 and the spiral members 16, as shown in FIG. 13, for example. The product material 50 can thereby be pushed by the spiral members 16 approximately in the center point along the height of the material. Therefore, the force of the spiral members 16 for conveying the product material 50 can be increased in comparison with cases in which the bottom ends of the product material 50 are pushed by the spiral members 16 due to the absence of spaces S.

With the combination weighing apparatus 101 according to the present embodiment, the conical members 30, 40 have flared shapes, making it possible for the height of the drop when the product material 50 falls from the distal ends of the conical members 30, 40 onto the product material conveying surfaces of the troughs 15 to be increased in comparison with the cylinder member 20. The effect of separating or distributing highly adhesive or clumped product material 50 is thereby increased. Since the flared shapes of the conical members 30, 40 correspond to (resemble) the flared shapes of the spiral members 16, the dimensions of the spaces S between the conical members 30, 40 and the spiral members 16 are constant throughout all locations on the conical members 30, 40. Therefore, it is possible to avoid the occurrence of locations having excessively small spaces S and a reduced conveying force, or, conversely, locations in which the dimensions of the spaces S are greater than the height dimension of the product material 50, and the conveying force is zero.

Figure 20:
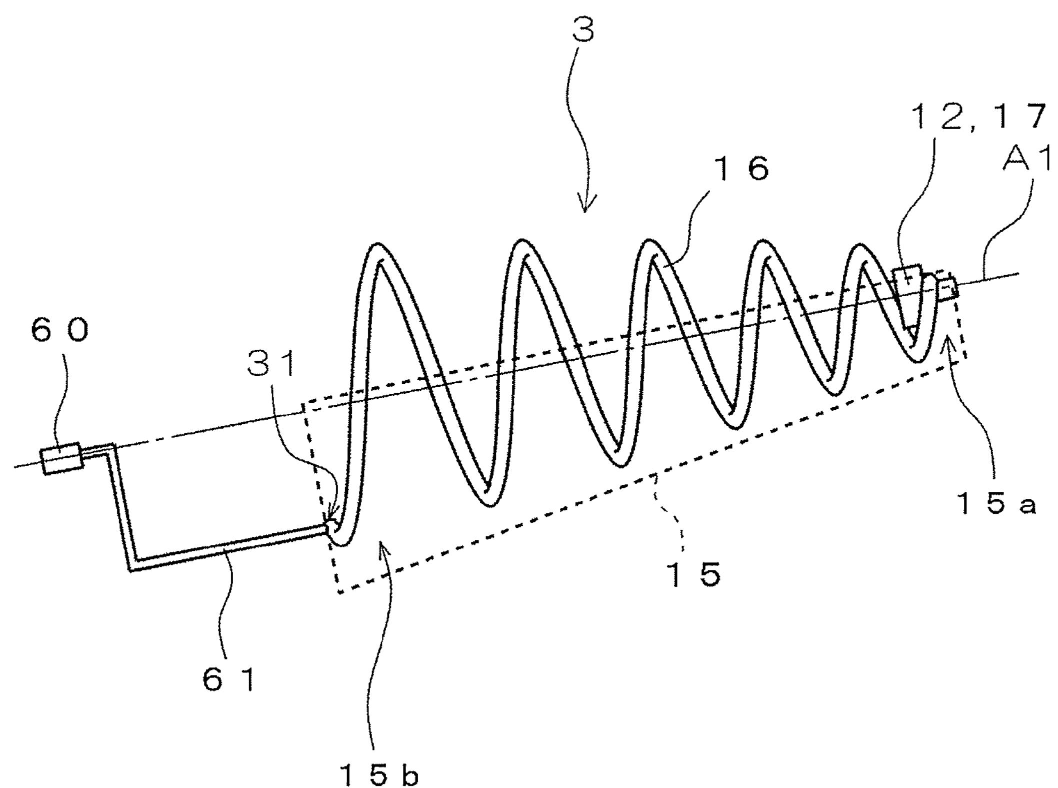
FIG. 20 is a side view of showing the structure of a conveying mechanism according to a first modification.
Figure 21:
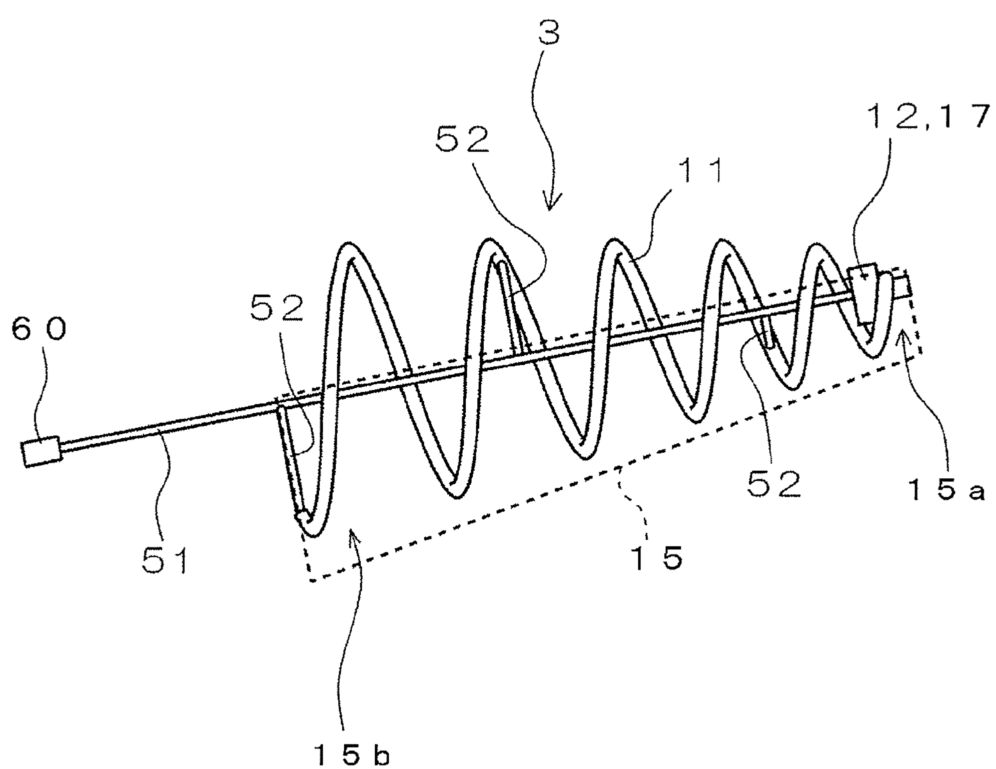
FIG. 21 is a side view showing the structure of a conveying mechanism according to a second modification.

MODIFIED EXAMPLES (1) FIGS. 20 and 21 are side views showing the structures of conveying mechanisms 3 according to first and second modifications, respectively.

Referring to FIG. 20, one end of a bent rod-shaped support member 61 is fixed to the outside end 31 of a spiral member 16. The other end of the support member 61 is fixed to a bearing 60. The bearing 60 is rotatably fixed to a specific location on the frame of the combination weighing apparatus 1 or 101, as shown in FIGS. 3 through 5. FIGS. 3 and 4 show an example in which the present modification is applied to only one of two conveying mechanisms 3, but the present modification can be applied to all of a plurality of conveying mechanisms 3.

Referring to FIG. 21, one end of a rod-shaped support member 51 is fixed to a rotating shaft 12 or 17. The other end of the support member 51 is fixed to a bearing 60. As in the above description, the bearing 60 is rotatably fixed to a specific location on the frame of the combination weighing apparatus 1 or 101. One ends of rod-shaped beam members 52 are fixed to a plurality of locations on the support member 51, and the other ends of the beam members 52 are fixed to the spiral member 16.

There are no grooves formed in the surface of the support member 51. It is thereby possible to make it easier to clean the support member 51. In other words, dust or fragments of product material are likely to become lodged in grooves, and a cleaning operation for removing the dust or the like from the grooves would be troublesome. On the other hand, dust or the like on the surface of a support member 51 having no grooves can be easily removed by wiping the dust off, and the support member can therefore be cleaned more easily.

The support members 61, 51 support the spiral members 16 while keeping the spiral members slightly raised off the bottom surfaces of the troughs 15, as shown in FIGS. 20 and 21.

The spiral members 16 thereby do not come in contact with the bottom surfaces of the troughs 15. As a result, it is possible to avoid situations in which the bottom surfaces of the troughs 15 are cut by the rotatably driven spiral members 16.

Figure 22:
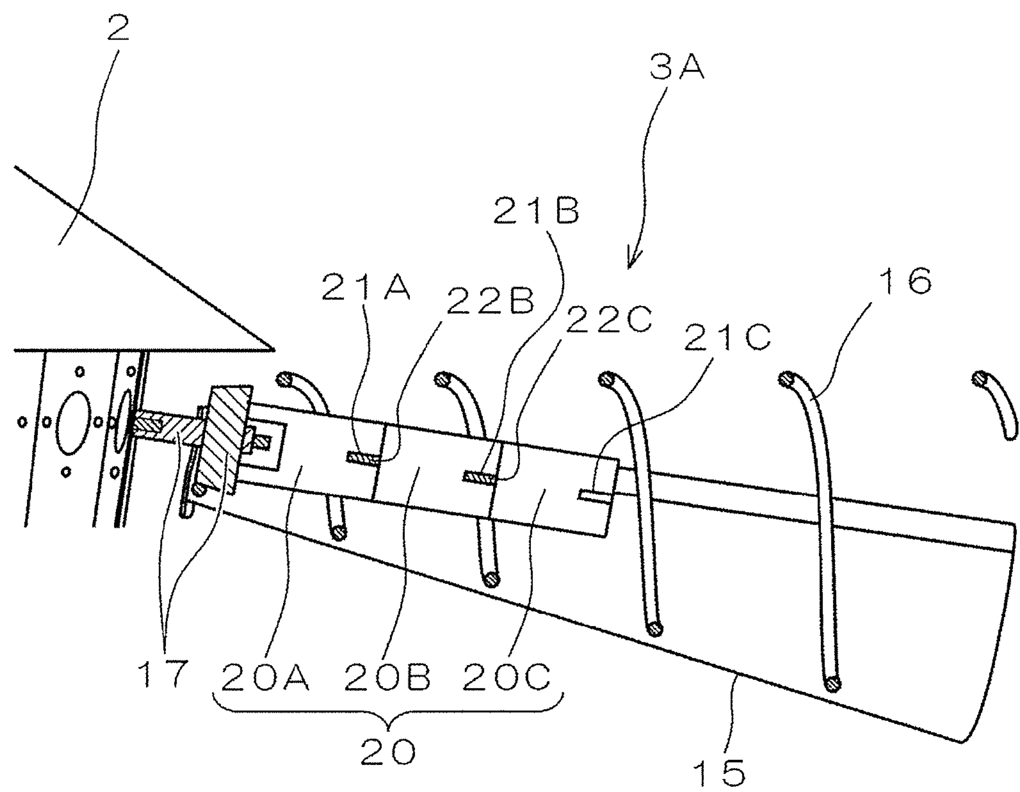
FIG. 22 is a side view showing the structure of a conveying mechanism according to a third modification.

(2) FIG. 22 is a side view (part of which is a cross-sectional view) showing a conveying mechanism 3A according to a third modification. One cylinder member 20 is configured by linking together a plurality (three in the example in FIG. 22) of cylinder members 20A to 20C. Specifically, a screw 22B fixed to the cylinder member 20B is screwed into a screw hole 21A formed in the cylinder member 20A, thereby linking together the cylinder members 20A, 20B. Similarly, a screw 22C fixed to the cylinder member 20C is screwed into a screw hole 21B formed in the cylinder member 20B, thereby linking together the cylinder members 20B, 20C. A screw hole 21C is formed in the cylinder member 20C to allow another cylinder member to be linked. Thus, it is possible to vary the entire length of the cylinder member 20 by varying the number of cylinder members 20B, 20C linked to the cylinder member 20A. The third modification can be applied not only to the conveying mechanism 3A (the cylinder member 20), but to the conveying mechanism 3B (the conical member 30) as well.

(3) FIG. 23 is a side view (part of which is a cross-sectional view) showing a conveying mechanism 3A according to a fourth modification. The cylinder member 20A is hollow, and a threaded structure is formed on the internal surface thereof. The external surface of the cylinder member 20B has a threaded structure for threaded engagement with the threaded structure of the cylinder member 20A. The cylinder member 20B can be rotated to vary the length by which the cylinder member 20B protrudes from the distal end of the cylinder member 20A, whereby the entire length of the cylinder member 20 can be varied.

In the third and fourth modifications, the amount of product material 50 held on the cylinder member 20 in the conveying mechanism 3A can be increased by increasing the length of the cylinder member 20. The amount of product material 50 held on the cylinder member 20 in the conveying mechanism 3A can also be reduced by reducing the length of the cylinder member 20. Therefore, it is possible to adjust the amount of product material 50 discharged from a trough 15 by appropriately setting the length of the cylinder member 20 in accordance with the target weight, size, shape, or properties of the product material.

The first through fourth modifications can be combined in an arbitrary manner.

With the combination weighing apparatus according to the above described embodiments, the dispersion unit is configured and arranged to radially disperse product material dropped in from above, the conveying units are arranged around a periphery of the dispersion unit, and the weighing units are arranged around a periphery of the conveying units. Each of the conveying units includes a trough having an inside end positioned below the dispersion unit and an outside end positioned above the weighing unit. At least one of the troughs has a cross-sectional diameter that gradually increases generally from the inside end to the outside end so that the one of the troughs and an adjacent one of the troughs are kept in contact with each other substantially all the way from the inside ends to the outside ends. At least one of the conveying units has a spiral member disposed over a bottom surface of the trough. The spiral member is configured and arranged to convey the product material supplied from the dispersion unit toward the outside end of the trough by being rotatably driven.

With such a combination weighing apparatus, adjacent troughs are in contact with each other substantially all the way from the inside ends to the outside ends. Therefore, even if product material spills over from one trough, the spilled product material can be supplied into its adjacent trough. As a result, the falling of product material through the space between adjacent troughs can be prevented.

With the combination weighing apparatus according to the above described embodiments, the troughs are inclined so that the outside ends are positioned lower than the inside ends.

With such a combination weighing apparatus, the troughs are disposed at an incline in a vertical direction, whereby the spiral members are also disposed at an incline in a vertical direction. The vibration caused by the rotation of the spiral members acts as disturbance noise for the weighing units, but this disturbance noise can be reduced by disposing the spiral members at an incline. In other words, by disposing the spiral members at an incline, the direction in which centrifugal force acts on the spiral members is also inclined, and only the vertical components of the centrifugal force act as disturbance noise for the weighing units. Therefore, the disturbance noise for the weighing units can be reduced in comparison with an apparatus in which the spiral members are disposed horizontally and the centrifugal force acts directly in a vertical direction.

Moreover, the troughs are disposed at an incline so that the outside ends thereof are positioned lower than the inside ends. In other words, it is easier for the product material to advance from the inside ends to the outside ends by sliding down. As a result, the efficiency with which the product material is conveyed by the conveying units can be increased.

With the combination weighing apparatus according to the above illustrated embodiments, the spiral member is arranged so that a spiral pitch in the vicinity of the outside end is greater than a spiral pitch in the vicinity of the inside end.

With such a combination weighing apparatus, the spiral pitch of the spiral member in the vicinity of the outside end is greater than that in the vicinity of the inside end. Therefore, product material can be distributed in the length direction of the trough in the vicinity of the outside end of the trough. As a result, it is possible to accurately control the amount of product material supplied from the conveying unit to the weighing unit.

With the combination weighing apparatus according to the above illustrated embodiments, the spiral member is arranged so that a spiral diameter in the vicinity of the outside end is greater than a spiral diameter in the vicinity of the inside end.

With such a combination weighing apparatus, the spiral diameter of the spiral member in the vicinity of the outside end is greater than that in the vicinity of the inside end. Therefore, product material can be distributed in the width direction of the trough in the vicinity of the outside end of the trough. As a result, it is possible to accurately control the amount of product material supplied from the conveying unit to the weighing unit.

The combination weighing apparatus may further include a support member supporting the spiral member so that there is no contact between the spiral member and the bottom surface of the trough.

With such a combination weighing apparatus, the support member supports the spiral member, whereby the spiral member does not come in contact with the bottom surface of the trough. As a result, it is possible to prevent the bottom surface of the trough from being damaged due to the rotational driving of the spiral member.

With the combination weighing apparatus according to the second embodiment described above, the at least one of the conveying units further has a regulating unit configured and arranged to regulate a supply of the product material supplied from the dispersion unit onto the bottom surface of the trough With such a combination weighing apparatus, the flow of product material conveyed from the dispersion unit onto the bottom surface of the trough is regulated by the regulating unit. Therefore, it is possible to prevent a circumstance in which an excessive amount of product material is supplied to the weighing unit.

With the combination weighing apparatus according to the second embodiment described above, the regulating unit is configured and arranged to temporarily hold at least some of the product material supplied from the dispersion unit and thereafter to supply the product material onto the bottom surface of the trough.

With such a combination weighing apparatus, at least some of the product material supplied from the dispersion unit is temporarily held, rather than being immediately supplied onto the bottom surface of the trough. Therefore, it is possible to prevent a circumstance in which an excessive amount of product material is supplied to the weighing unit.

With the combination weighing apparatus according to the second embodiment described above, the regulating unit has a core member disposed in an internal space of the spiral member in the vicinity of the inside end with a length of the core member being adjustable.

With such a combination weighing apparatus according to the eighth aspect, the amount of product material held in the conveying unit can be increased by increasing the length of the core member, and the amount of product material held in the conveying unit can be reduced by reducing the length of the core member. Therefore, it is possible to adjust the amount of product material discharged from the trough by appropriately setting the length of the core member in accordance with the target weight, size of the product material or the like.

With the combination weighing apparatus according the second embodiment, the regulating unit has a core member disposed in an internal space of the spiral member in the vicinity of the inside end, the spiral member has a flared shape so that a spiral diameter of the spiral member gradually increases substantially from an inside end toward an outside end, and the core member has a flared shape corresponding to the flared shape of the spiral member.

With such a combination weighing apparatus, since the flared shape of the core member corresponds to the flared shape of the spiral member, the dimension of the space between the core member and the spiral member can be substantially constant throughout all locations of the core member. Therefore, it is possible to avoid the occurrence of, e.g., locations having an excessively small space and a reduced conveying force, or, conversely, locations in which the dimension of the space is greater than the height dimension of the product material, and the conveying force is zero. The core member has a flared shape, which may make it possible to increase the height of the drop when the product material falls from the distal end of the core member onto the bottom surface of the trough. In such a case, the effect of separating or distributing highly even adhesive or clumped product material is thereby increased.

With the combination weighing apparatus according to the second embodiment described above, the regulating unit has a core member disposed in an internal space of the spiral member in the vicinity of the inside end, and the core member is disposed in a position such that the product material is conveyed on the core member while being pushed by the spiral member that is rotatably driven.

With such a combination weighing apparatus, the product material is conveyed on the core member while being pushed by the spiral member. For example, when a space is formed between the core member and the spiral member in accordance with the size of the product material, the product material can be conveyed on the core member while being pushed by the spiral member. More specifically, when a space whose size is about half the height of the product material is formed between the core member and the spiral member, the product material can be pushed by the spiral member in a point approximately in the center point along the height of the material. In such a case, the force of the spiral member for conveying the product material can be increased in comparison with cases in which the bottom ends of the product material are pushed by the spiral member due to the absence of the space.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A combination weighing apparatus comprising:

a dispersion unit configured and arranged to radially disperse product material dropped in from above;

a plurality of conveying units arranged around a periphery of the dispersion unit; and a plurality of weighing units arranged around a periphery of the conveying units, each of the conveying units including a trough having an inside end positioned below the dispersion unit and an outside end positioned above the weighing unit, at least one of the troughs having a cross-sectional diameter that gradually increases generally from the inside end to the outside end so that the one of the troughs and an adjacent one of the troughs are kept in contact with each other substantially all the way from the inside ends to the outside ends, and at least one of the conveying units having a spiral member disposed over a bottom surface of the trough, the spiral member being configured and arranged to convey the product material supplied from the dispersion unit toward the outside end of the trough by being rotatably driven, the spiral member having a shape in which a spiral diameter in the vicinity of the outside end is greater than a spiral diameter in the vicinity of the inside end.

2. The combination weighing apparatus according to claim 1, wherein the troughs are inclined so that the outside ends are positioned lower than the inside ends.

3. The combination weighing apparatus according to claim 1, wherein the spiral member having a shape in which a spiral pitch in the vicinity of the outside end is greater than a spiral pitch in the vicinity of the inside end.

4. The combination weighing apparatus according to claim 1, further comprising a support member supporting the spiral member so that there is no contact between the spiral member and the bottom surface of the trough.

5. The combination weighing apparatus according to claim 1, wherein the at least one of the conveying units further has a regulating unit configured and arranged to regulate a supply of the product material supplied from the dispersion unit onto the bottom surface of the trough.

6. The combination weighing apparatus according to claim 5, wherein the regulating unit is configured and arranged to temporarily hold at least some of the product material supplied from the dispersion unit and thereafter to supply the product material onto the bottom surface of the trough.

7. The combination weighing apparatus according to claim 5, wherein the regulating unit has a core member disposed in an internal space of the spiral member in the vicinity of the inside end with a length of the core member being adjustable.

8. The combination weighing apparatus according to claim 5, wherein the regulating unit has a core member disposed in an internal space of the spiral member in the vicinity of the inside end, the spiral member has a flared shape so that a spiral diameter of the spiral member gradually increases substantially from an inside end toward an outside end, and the core member has a flared shape corresponding to the flared shape of the spiral member.

9. The combination weighing apparatus according to claim 5, wherein the regulating unit has a core member disposed in an internal space of the spiral member in the vicinity of the inside end, and the core member is disposed in a position such that the product material is conveyed on the core member while being pushed by the spiral member that is rotatably driven.

10. The combination weighing apparatus according to claim 1, wherein the spiral member is disposed over the bottom surface of the at least one of the troughs having the cross-sectional diameter that gradually increases generally from the inside end to the outside end.

* * * * *